(12) United States Patent
Banbury et al.

(10) Patent No.: US 7,809,611 B2
(45) Date of Patent: Oct. 5, 2010

(54) MULTI-STAGE AUTOMATED AUCTIONS

(75) Inventors: Martin John Banbury, Dedham (GB); Jonathan Marsden Bradshaw, Surbiton (GB); Fredrik Lexmon, London (GB)

(73) Assignee: Mediaequals Ltd, London (GB)

( * ) Notice: Subject to any disclaimer, the term of this patent is extended or adjusted under 35 U.S.C. 154(b) by 416 days.

(21) Appl. No.: 11/843,022

(22) Filed: Aug. 22, 2007

(65) Prior Publication Data

US 2008/0126238 A1   May 29, 2008

(30) Foreign Application Priority Data

Nov. 24, 2006 (GB) ................................. 0623425.6
May 9, 2007 (GB) ................................. 0708928.7

(51) Int. Cl.
*G06Q 30/00* (2006.01)
*G06F 17/30* (2006.01)
*G06Q 40/00* (2006.01)

(52) U.S. Cl. ................................ 705/26; 705/27; 705/37; 705/14

(58) Field of Classification Search .................. 705/26, 705/27, 37, 14
See application file for complete search history.

(56) References Cited

U.S. PATENT DOCUMENTS

| | | | | |
|---|---|---|---|---|
| 7,555,445 | B2 * | 6/2009 | Moya et al. | 705/26 |
| 7,593,866 | B2 * | 9/2009 | Grove et al. | 705/26 |
| 7,630,920 | B2 * | 12/2009 | Ishisaka | 705/26 |
| 2004/0019552 | A1 * | 1/2004 | Tobin | 705/37 |
| 2004/0254853 | A1 * | 12/2004 | Heene et al. | 705/26 |
| 2005/0033682 | A1 | 2/2005 | Levy et al. | |
| 2005/0171897 | A1 * | 8/2005 | Forsythe et al. | 705/37 |
| 2005/0187859 | A1 | 8/2005 | Growney et al. | |
| 2006/0271438 | A1 * | 11/2006 | Shotland et al. | 705/14 |
| 2007/0011050 | A1 * | 1/2007 | Klopf et al. | 705/14 |
| 2007/0088654 | A1 * | 4/2007 | Maltzman | 705/37 |

FOREIGN PATENT DOCUMENTS

| | | |
|---|---|---|
| WO | 01/75740 A2 | 10/2001 |
| WO | 02/097582 A2 | 12/2002 |

OTHER PUBLICATIONS

On a Possible Benefit to Bid Takers from Using Multi-stage Auctions (Engelbrecht-Wiggans, Richard Management Science; Sep. 1988; 34, 9; ABI/Inform Global p. 1109).*

* cited by examiner

*Primary Examiner*—Jeffrey A Smith
*Assistant Examiner*—Courtney Stopp
(74) *Attorney, Agent, or Firm*—Richard M. Goldberg

(57) ABSTRACT

An automated auctioning method is disclosed having a multifunction (pre-auction) stage (501), an auction stage (502) and a fulfillment stage (503). During the multifunction stage it is possible to buy an element (507), make an offer (506) or place an auction bid (504). During the auction stage it is only possible to place an auction bid.

11 Claims, 28 Drawing Sheets

| | 15th | 16th | 17th | 18th | 19th | 20th | 21st |
|---|---|---|---|---|---|---|---|
| FRONT ½ PAGE | | | ||||| ||||| ||||| ||||| | |
| BACK ½ PAGE | | ||||| | ||||| | | | |
| TV PAGE | | | | | | | |
| SPORTS PAGE | | | | | | | |
| PAGE 2 ¼ PAGE | | | | | | | |
| PAGE 3 ¼ PAGE | | | | ||||| | | | |
| PAGE 4 ¼ PAGE | | | | | | | |
| PAGE 5 ¼ PAGE | | | | | | | |

GROUP

Fig. 15

| 2003 | 2004 | 2005 | 2006 | 2007 | 2008 | 2009 |
|---|---|---|---|---|---|---|
| PUB DATE | AUCTION DATE | AD SIZE | AUCTION DISCOUNT | LIKELY POSITION | NET COST | JOIN AUCTION |
| MON 15 | FRI 12 | QTR PAGE | 15% | FRONT TOP | $12,000 | ☐ |
| MON 15 | FRI 12 | HALF PAGE | 15% | FRONT TOP | $12,000 | ☐ |
| MON 15 | FRI 12 | QTR PAGE | 12% | BACK BOTTOM | $12,000 | ☐ |
| MON 15 | FRI 12 | BANNER | 5% | INSIDE BACK | $9,500 | ☐ |
| TUE 16 | SAT 13 | QTR PAGE | 2% | PAGE 2/3 TOP | $14,000 | ☐ |

Fig. 20

| POSITION | NET PRICE | BID | BIDDER |
|---|---|---|---|
| 1 | | | B |

Fig. 26

| POSITION | NET PRICE | BID | BIDDER |
|---|---|---|---|
| 1 | | | C |
| 2 | | | A |

*Fig.27*

| POSITION | NET PRICE | BID | BIDDER |
|----------|-----------|-----|--------|
| 1 | ☐ | ☐ | C |
| 2 | ☐ | ☐ | A |
| 3 | ☐ | ☐ | B |

2305 — position 1 row
2701 — position 2 row
2801 — position 3 row

*Fig.28*

MULTI-STAGE AUTOMATED AUCTIONS

CROSS REFERENCE TO RELATED APPLICATIONS

This application claims priority from United Kingdom patent application number 0623425.6 filed on Nov. 24, 2006 and United Kingdom patent application number 0708928.7 filed on May 9, 2007, the entire contents of which are incorporated herein by reference.

TECHNICAL FIELD

The present invention relates to automated auctioning that takes place over a plurality of phases, possibly facilitated by the provision of serving apparatus or programmed computing equipment.

BACKGROUND OF THE INVENTION

Many auctioning techniques are known, including techniques for performing online auctioning activities over the Internet and similar networks. In these electronic auctions, it is necessary for the auctioning procedures to be conducted automatically by a server in response to receiving bids from browsing clients.

A problem exists in that basic auctioning procedures in known implementations often differ significantly from established non-technical approaches. Sophisticated automated processes are possible but problems often arise in terms of acceptability.

SUMMARY OF THE INVENTION

An automated auctioning method is provided, comprising a multi-function stage, an auction stage and a fulfillment stage. During the multi-function stage it is possible to buy an element, make an offer or place an auction bid. During the auction stage it is only possible to place an auction bid and during said fulfillment stage the results of the auction are implemented.

BRIEF DESCRIPTION OF THE SEVERAL VIEWS OF THE DRAWINGS

FIG. 13 details procedures for specific item selection as identified in FIG. 11;
FIG. 15 details procedures for entering an auction as identified in FIG. 11;
FIG. 20 shows a preferred embodiment in which offers are grouped;
FIG. 26 shows a further alternative view of a graphical user interface;
FIG. 27 shows a further alternative view of a graphical user interface;
and
FIG. 28 shows an alternative view of a graphical user interface.

DESCRIPTION OF BEST MODES FOR CARRYING OUT THE INVENTION

FIG. 1

Figure 1:
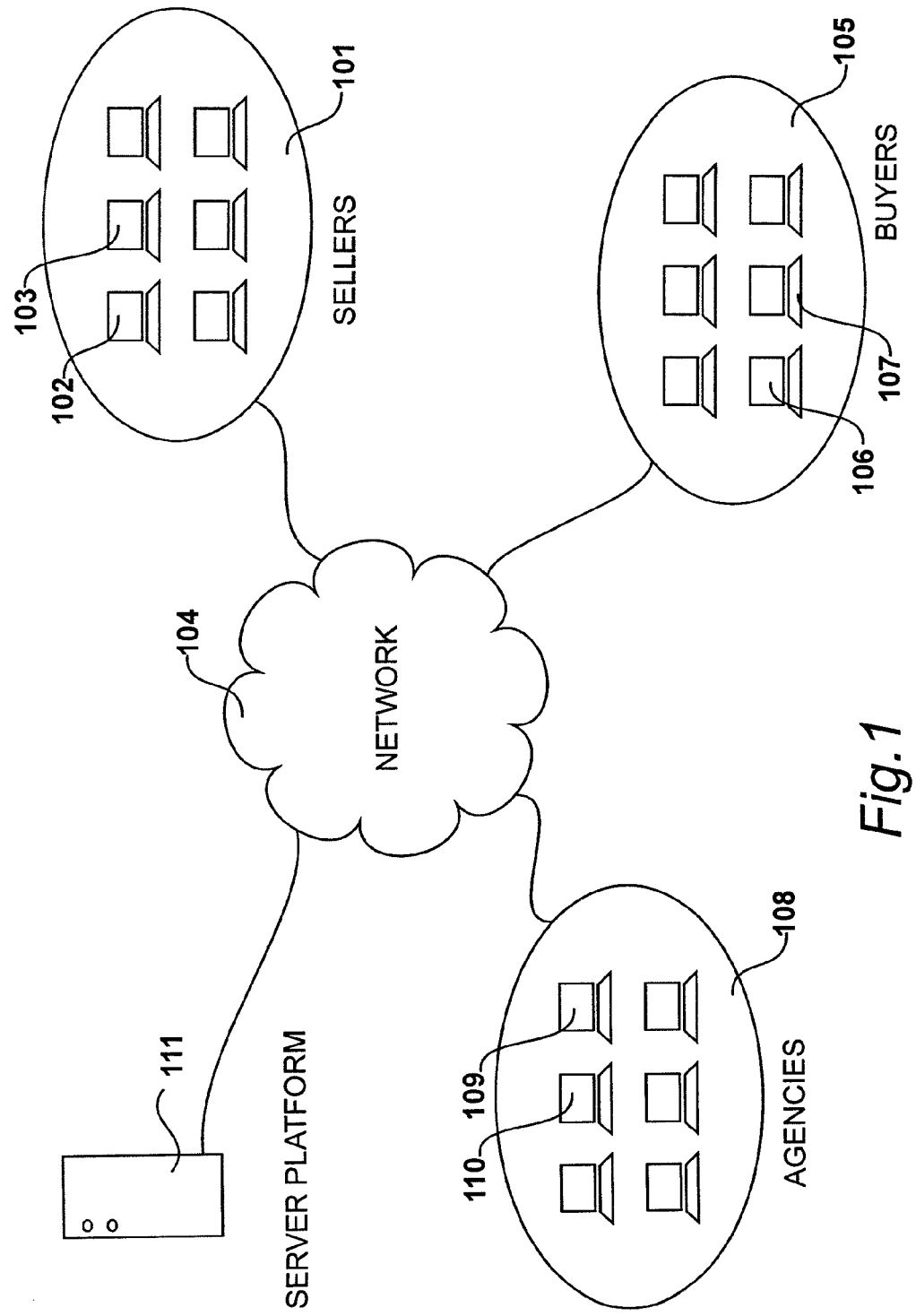
FIG. 1 shows an environment for automated auctioning.

An environment for automated auctioning is illustrated in FIG. 1. A plurality of sellers 101 each has a browser station 102, 103 etc, each provided with a browsing station 106, 107 etc. An auctioning facility would thereby provide a platform upon which it is possible for buyers 106, 107 to bid for products or services provided by the sellers 102, 103.

In this embodiment, a third group 108 of agencies is identified, again each individual agency being provided with a browser 109, 110, etc. In a preferred embodiment, described below, the auctioning environment is deployed with respect to the sale of advertising space, such as advertising space in daily newspapers etc. In this environment, it is well established for agencies to exist such that a buyer would approach an agency usually in preference to dealing with sellers directly. However, a preferred embodiment facilitates the existence of agencies but also facilitates direct selling activities.

The auctioning platform is provided by a server platform 111, communicating with the sellers 101, the buyers 105 and the agencies 108 via the network 104.

FIG. 2

Figure 2:
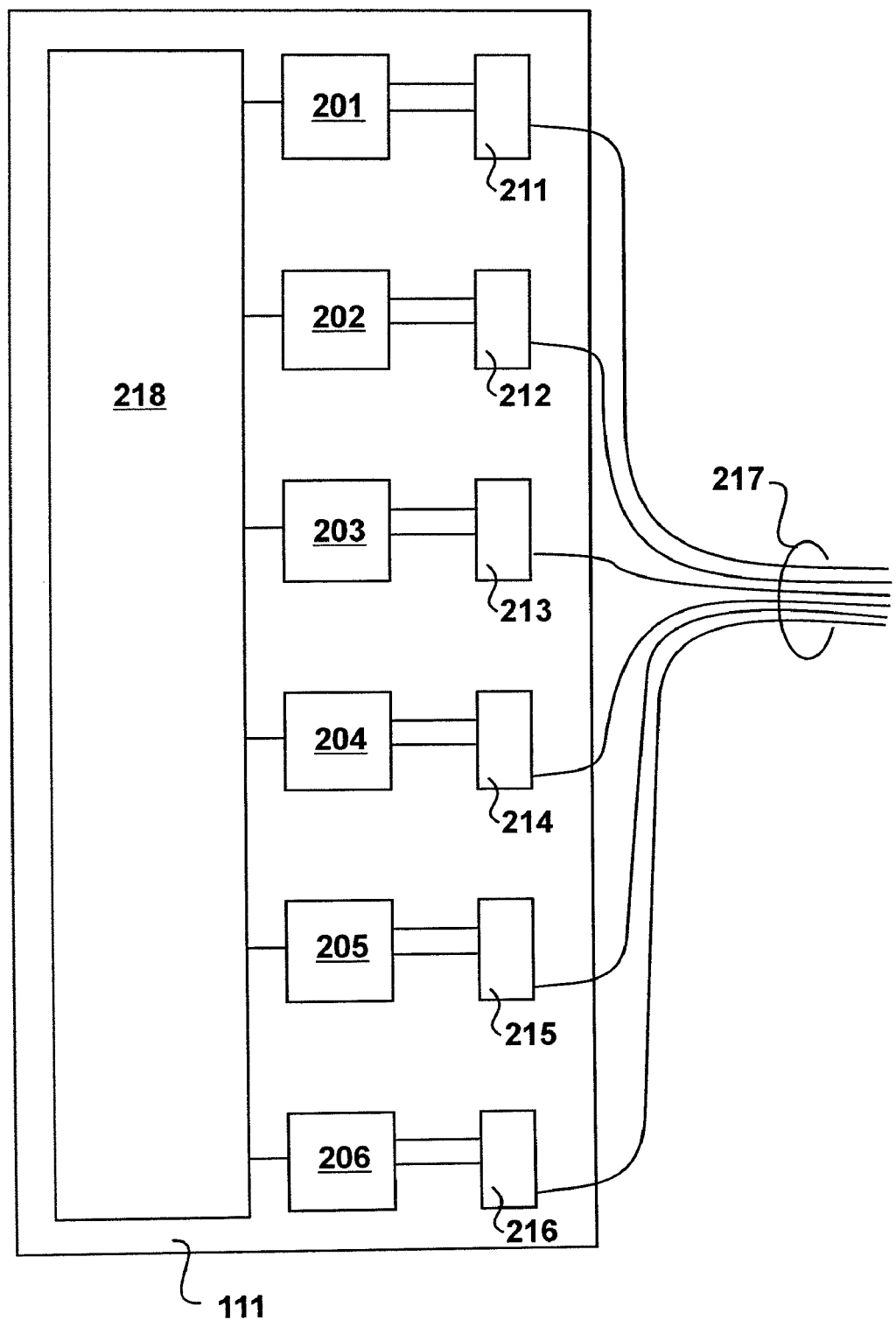
FIG. 2 details a server platform identified in FIG. 1.

Server platform 111 is detailed in FIG. 2. The server platform 111 includes a plurality of processing units 201 to 206. Each processing unit has a respective network interface 211 to 216 which in turn communicate with a high bandwidth channel 217 to the network 104.

In addition, the server platform is provided with a shared data resource 218, configured to store data relating to an auction, a plurality of related auctions or even a plurality of unrelated auctions. That is to say, the system may simultaneously facilitate the auctioning of unrelated products and/or services representing many different sectors. For the purposes of illustration, embodiments described herein refer to the auctioning of advertising space.

FIG. 3

Figure 3:
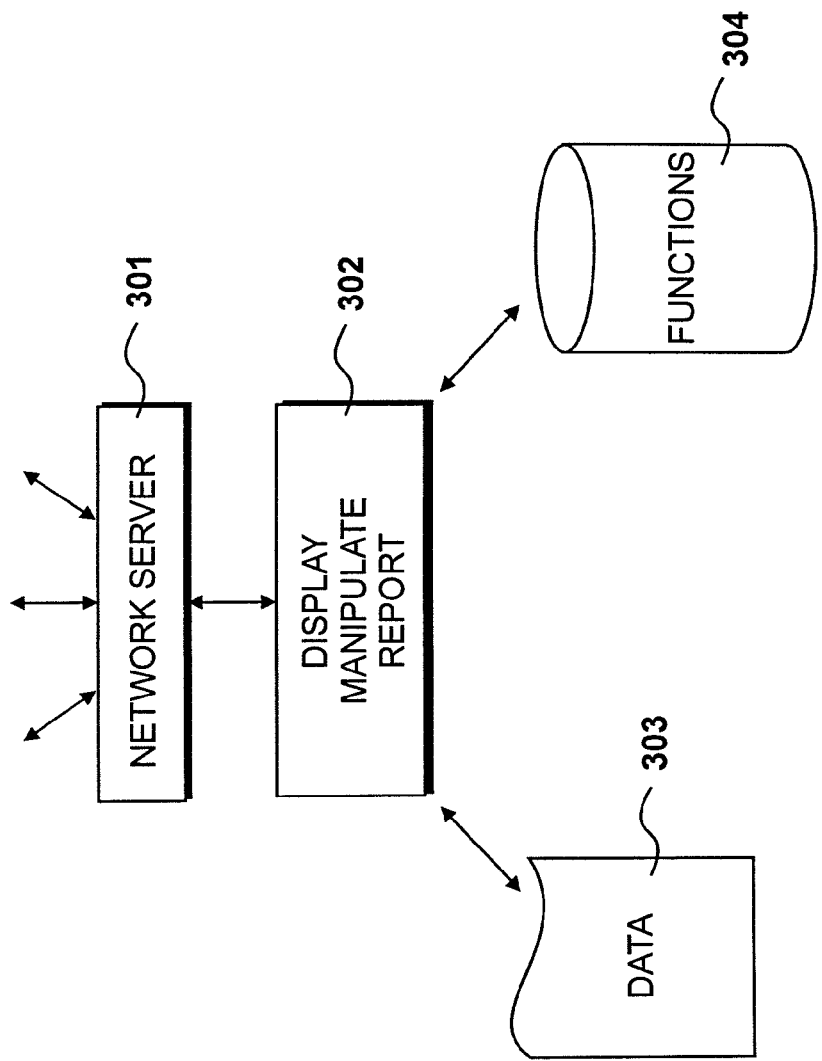
FIG. 3 shows operations performed by a typical processing unit of the type identified in FIG. 2.

Operations performed by a typical processing unit (such as processing unit 201) are illustrated in FIG. 3. Functionality is provided for the inclusion of a network server application 301 and a data processing facility 302 configured to manipulate data, generate display data for browsing equipment (such as equipment 102) and to generate reports for internal management purposes. Consequently, processor 302 supplies data 303 and receives data from the data storage system 218. Similarly, the processor 302 performs functions upon data 303 in response to program instructions received from program storage 304.

FIG. 4

Figure 4:
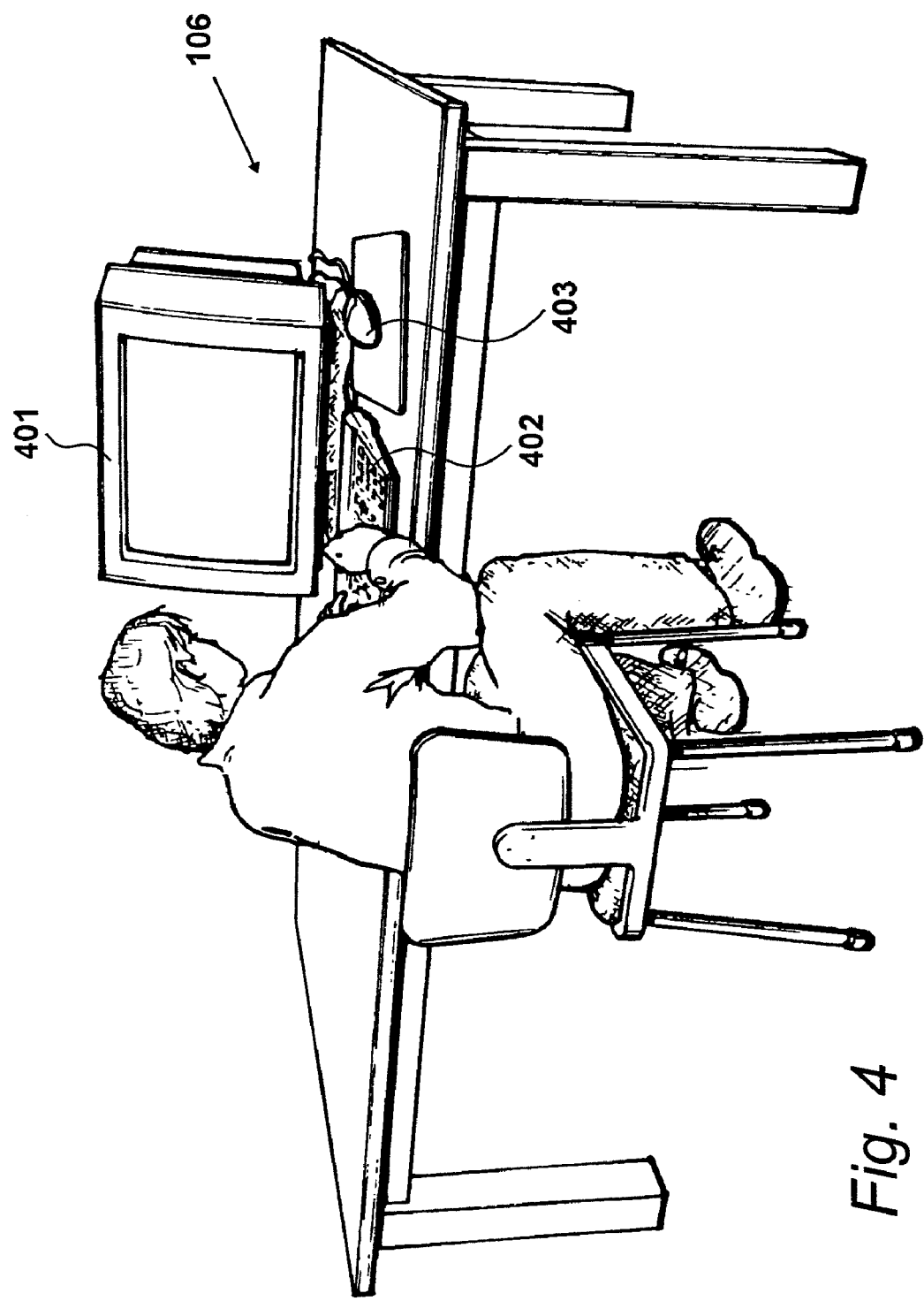
FIG. 4 illustrates a typical browser station.

A typical browser, such as browser station 106 is illustrated in FIG. 4. Auction details are displayed to a user via a visual display unit 401. Data entry is facilitated via a keyboard 402 and a mouse 403.

FIG. 5

Multi Stage Auction

The environment shown in FIG. 1 and as further detailed with respect to FIGS. 2 and 4 may, in a first preferred embodiment, provide an automated auctioning environment which consists of a multifunction stage 501, an auction stage 502 and a fulfillment stage 503. In this embodiment, the auctioning procedure takes place during the auction stage 502, during which it is possible for a buyer (from set 105) to place a bid, as illustrated by portion 504.

The multifunction stage 501 may be considered as a pre-auction stage during which it is also possible to place a bid, as illustrated by portion 505. Having placed a bid during stage 501, no action is taken during the pre-auction stage but the bid then goes forward in to the auction stage 502.

Figure 5:
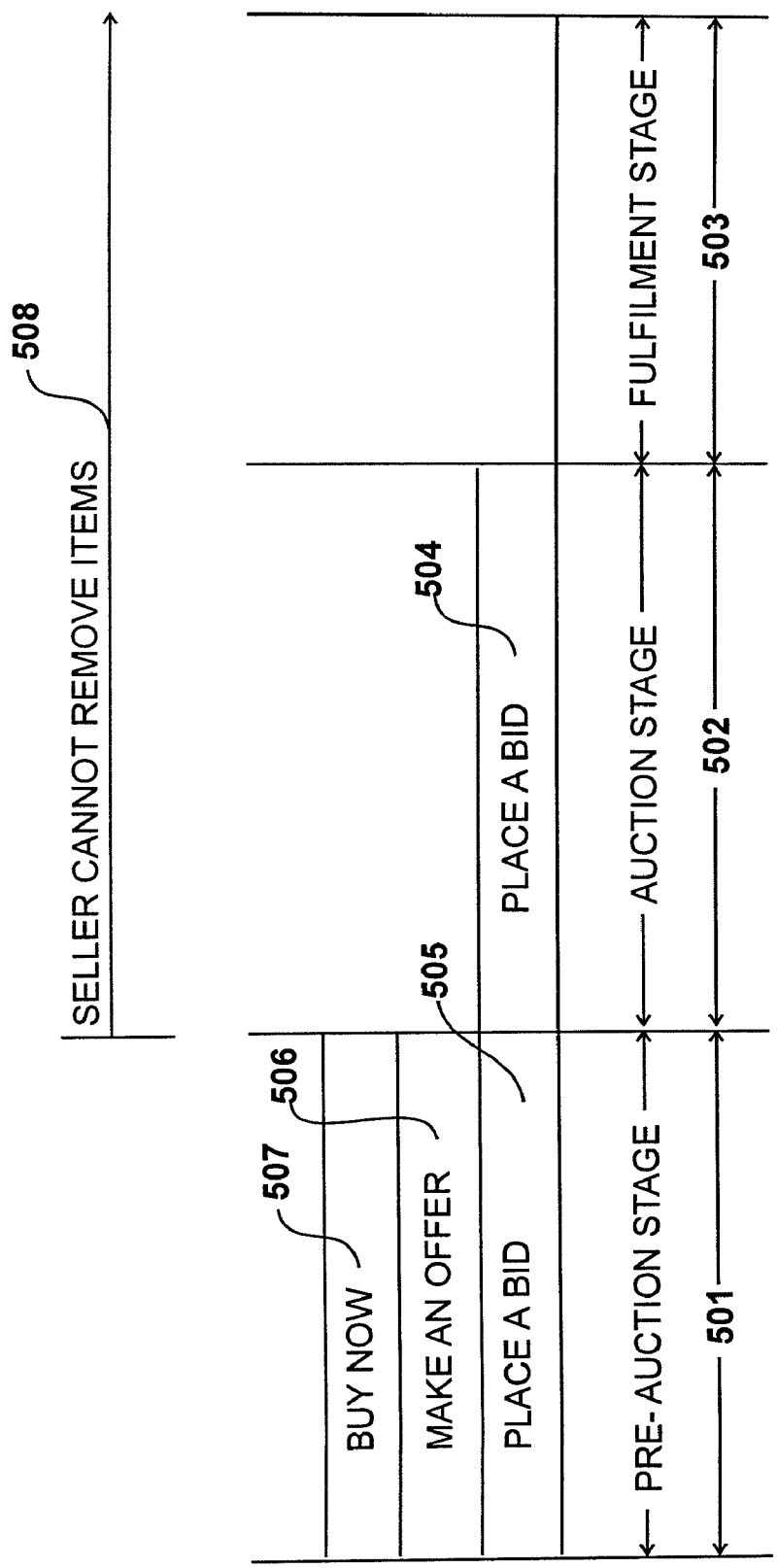
FIG. 5 illustrates a plurality of auctioning stages.

The pre-auction stage has also been referred to as a multifunction stage because as illustrated in FIG. 5 it is also possible, in this embodiment, to make an offer, as illustrated by portion 506 or to buy the item at an asking price, as illustrated by portion 507.

Thus, in the preferred embodiment, items are identified that are effectively for sale at a predetermined price. If a buyer is prepared to pay this price, a sale is made in a conventional manner. As an alternative, it is possible for a potential buyer to make an offer. In response to making an offer, the offer price is received at the server platform 111 and then conveyed to the appropriate seller, from set 101. The communication identifying the offer may take the form of an email and a user (ie a seller) may respond to such an email either manually or automatically. Furthermore, it could be possible for the buyer and the seller to be placed in communication directly and negotiations could continue by telephone for example. In this way, it may be possible for an offer to be accepted which is lower than the initial asking price. However, under these circumstances a sale takes place and the item would not then go forward to the auction stage.

It is therefore appreciated that, in the preferred embodiment, at the end of the pre-auction stage 501 an item may have been bought at the asking price, sold in response to an offer being made (usually below the asking price), not sold but put forward to the auction stage or removed from the auction stage.

During the pre-auction stage 501 a seller may at any time remove the item or at least notify potential buyers to the effect that the item will not go through to the auction stage. However, as illustrated by arrow 508, items must be removed from the auction during the pre-auction stage if they are to be removed at all. Upon commencement of the auction stage, the seller is then committed to allow the item to enter the auction. Similarly, if a bid has been placed during the pre-auction stage and the item subsequently enters the auction, the potential buyer is committed to the auction price bid.

Stage 503 identified as the fulfillment stage effectively defines the point (at the end of stage 502) when the auction is considered closed and as such items may remain unsold or items have been sold and the appropriate fulfillment is carried out. In one embodiment, it is possible for a seller to establish a reserve price thus, it is possible that an auction bid may have been made for a particular item but if this bid is below the reserve, the item will not be considered sold. It may be possible for the reserve price to be made known to bidders or alternatively the reserve prices may be kept confidential.

FIG. 6

Figure 6:
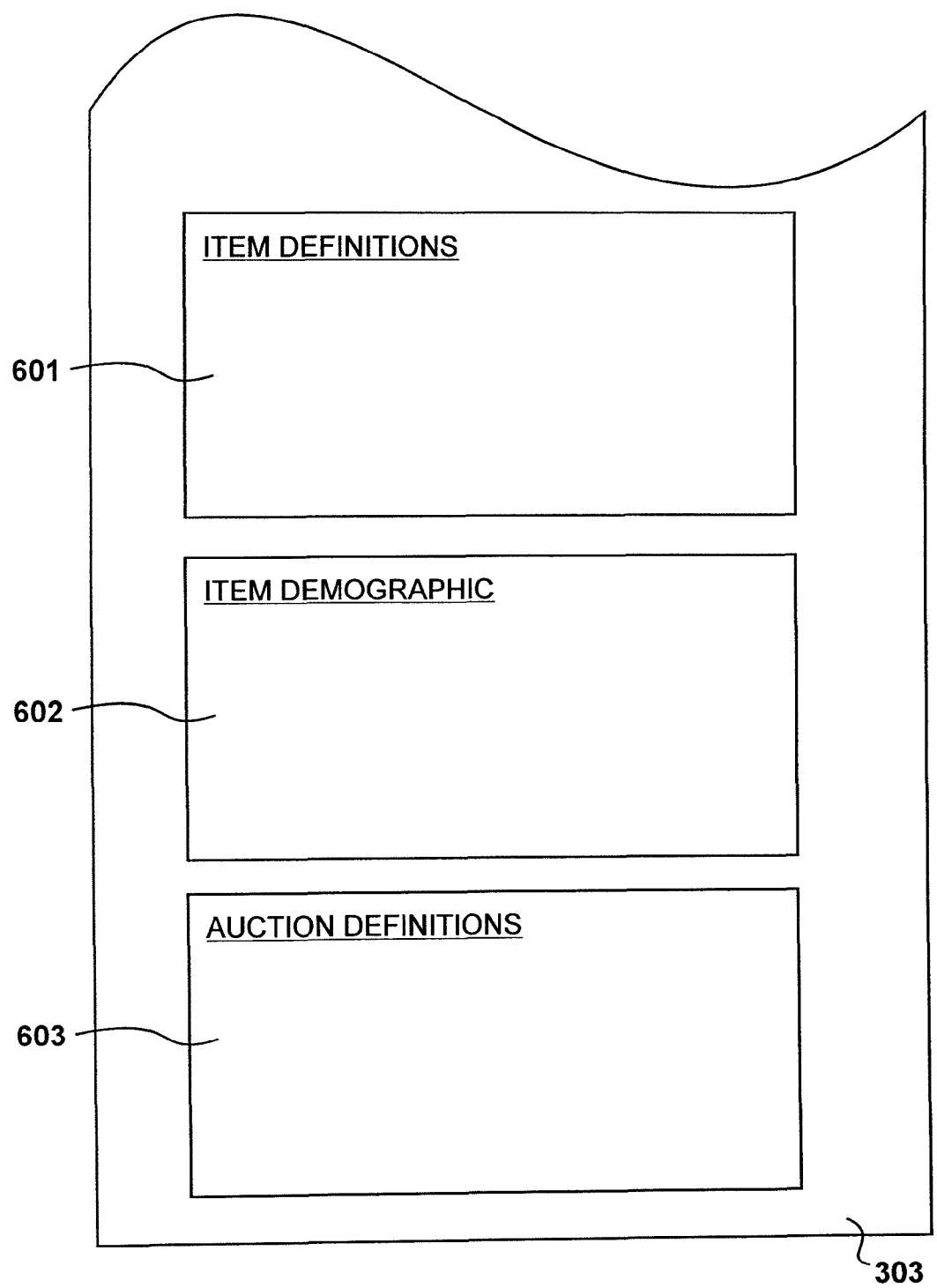
FIG. 6 illustrates a data structure of the type shown in FIG. 5.

An example of the structure of data contained within data volume 303 is detailed in FIG. 6. As illustrated, for a particular auction, the data 303 contains item definitions 601, item demographics 602 and auction definitions 603.

FIG. 7

Figure 7:
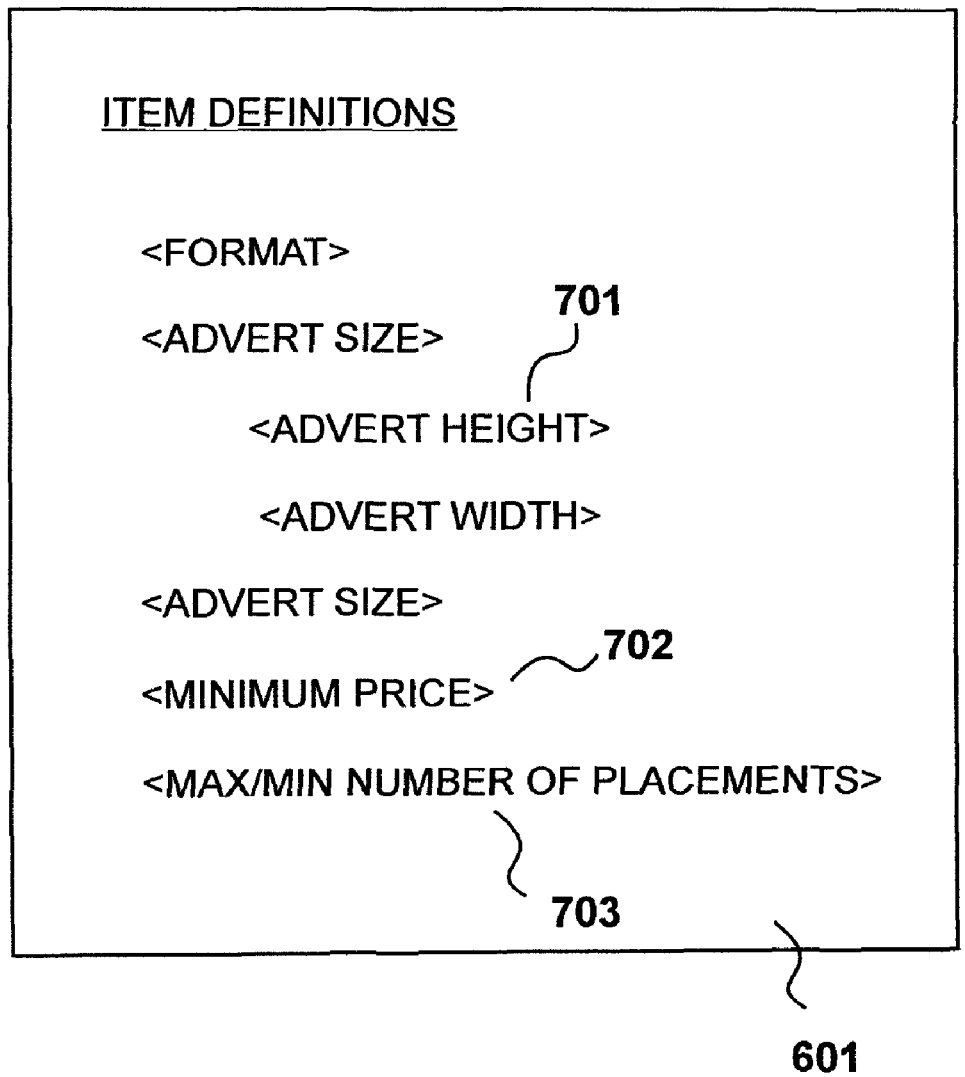
FIG. 7 shows an example of an item definition of the type identified in FIG. 6.

An example of an item definition 601 is shown in FIG. 7. In this data file, a field 701 is reserved for specifying the size of the advertisement. In addition, a field 702 specifies a recommended price which in the arena of media advertising, is often referred to as the "rate card" price. Furthermore, a field 703 identifies the maximum number of placements that would occur in a particular publication, along with the minimum number of placements that would occur in the publication. From this, it can be seen that a plurality of placements may be included that represent individual elements or instantiations of an item. Each of these elements is similar but not identical. Thus, it is possible to develop a ranking in terms of their perceived value. Consequently, elements may be allocated to particular bidders based on this perceived ranking such that a bidder bidding the highest premium is allocated the element having the highest perceived value.

FIG. 8

Figure 8:
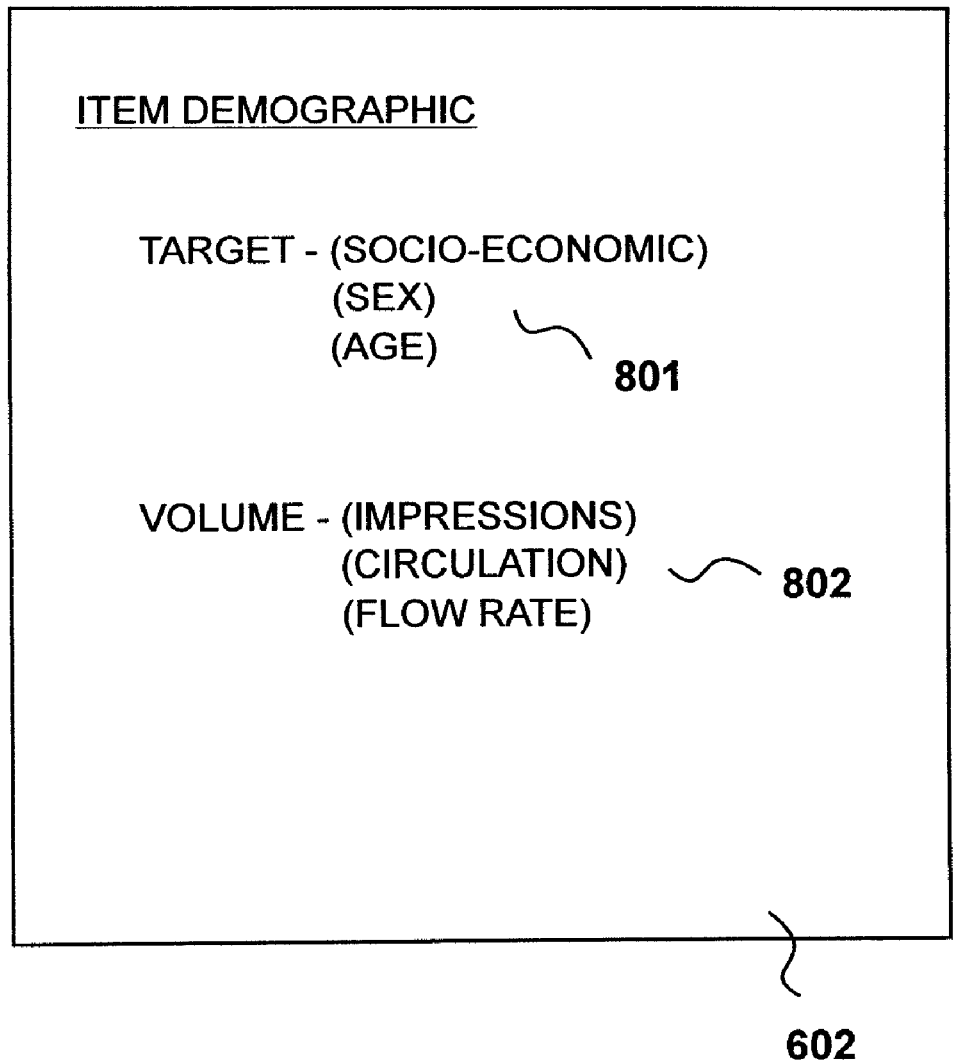
FIG. 8 shows an example of an item demographic file of the type shown in FIG. 2.

An example of an item demographic file 602 is illustrated in FIG. 8. The item demographic file 602 includes fields 801 identifying attributes of the target audience; that is to say the audience to whom the advertisements are directed. In addition, the item demographic file 602 also includes fields 802 relating to the volume achieved for a particular publication or similar advertising media. Thus, in radio advertising for example, the volume figure would relate to the number of impressions that occur, that is to say the number of times the audio advertisement is broadcast. Similarly, paper publications would identify volume in terms of their circulation figures. Other advertising opportunities such as stand locations at exhibitions for example would identify volume with respect to the rate of flow of people passing a particular stand of the exhibition.

FIG. 9

Figure 9:
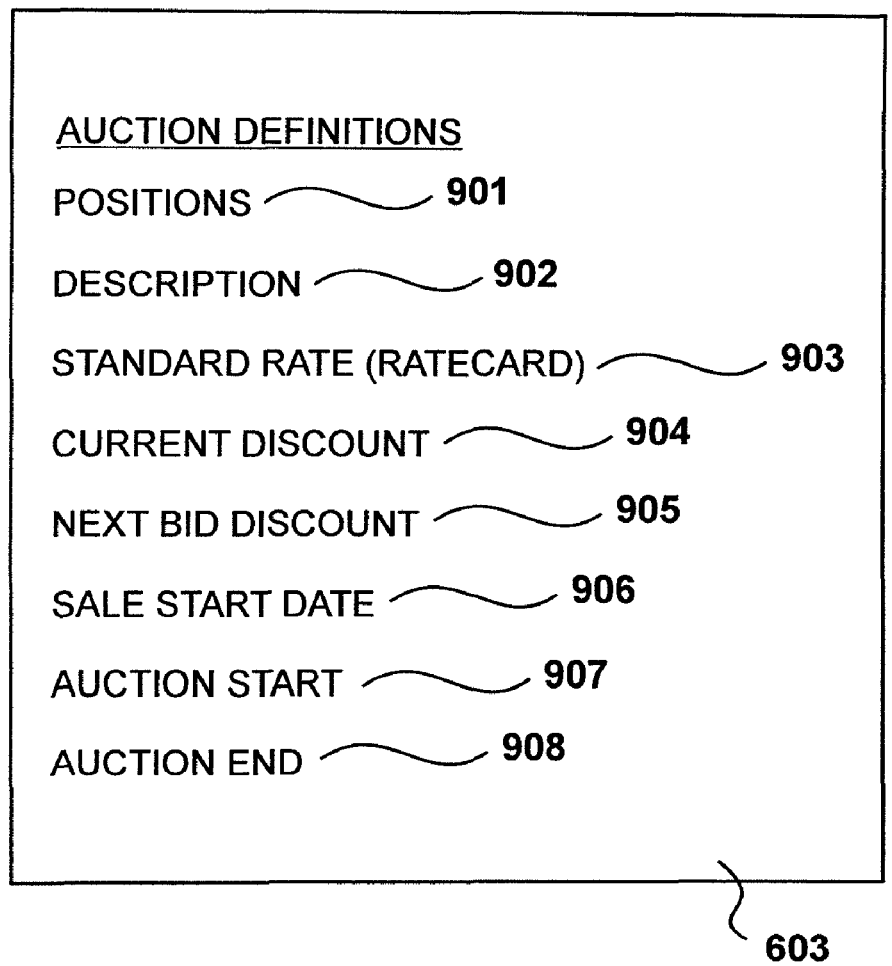
FIG. 9 shows an example of an auctioning definition file of the type shown in FIG. 6.

An example of an auction definition file is illustrated in FIG. 9. At field 901 the file defines the positions available for the advertisements in the auction. At field 902 a description is made of the particular type of advertisement space available. At field 903 the standard rate or rate card figure is recorded and at field 904 a current discount figure is recorded. At field 905 a value for the next bid discount is recorded such that during the auction process, fields 904 and 905 will be updated.

At field 906 a sale start date is identified, representing the first date during which it is possible to purchase advertising space (the pre-auction phase), usually at the standard rate card rate, subject to the modifications identified below. Thus, when advertising space is purchased in this way, the opportunity is removed from the subsequent auction during the second phase (the auction phase).

At field 907 an auction start date is recorded and at field 908 an auction end date is recorded.

FIG. 10

In a preferred embodiment, there is provided a method of automating the sale of items in which an item is offered for sale at a discount over a predetermined period of time. In this preferred embodiment, the discount is defined as a function with respect to time such that the available discount varies with time.

In a preferred embodiment, the discount decreases over time so as to encourage early commitment.

Figure 10:
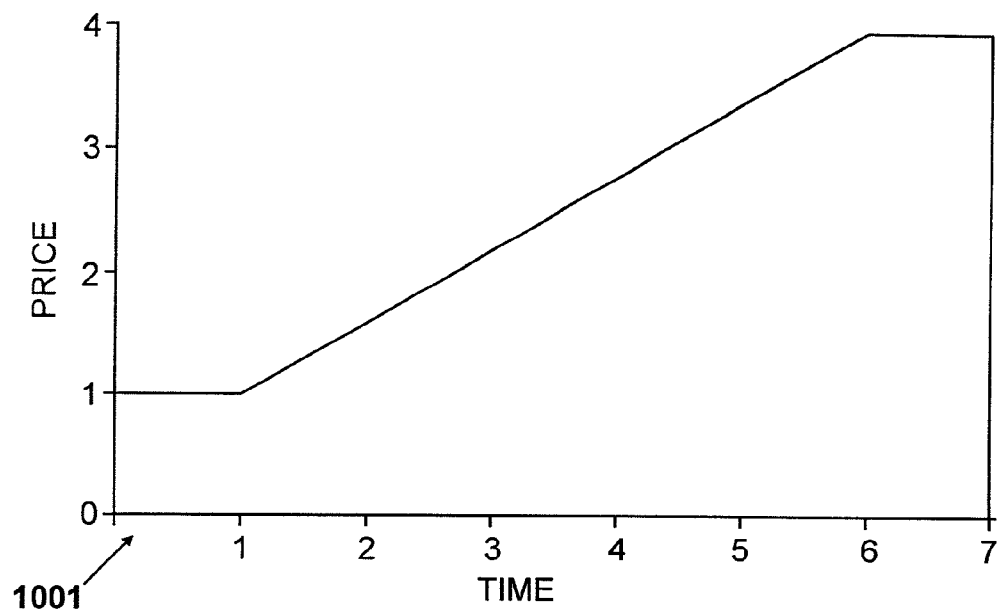
FIG. 10 illustrates a functional environment of the operations performed in the environment of FIG. 1.
Figure 10:
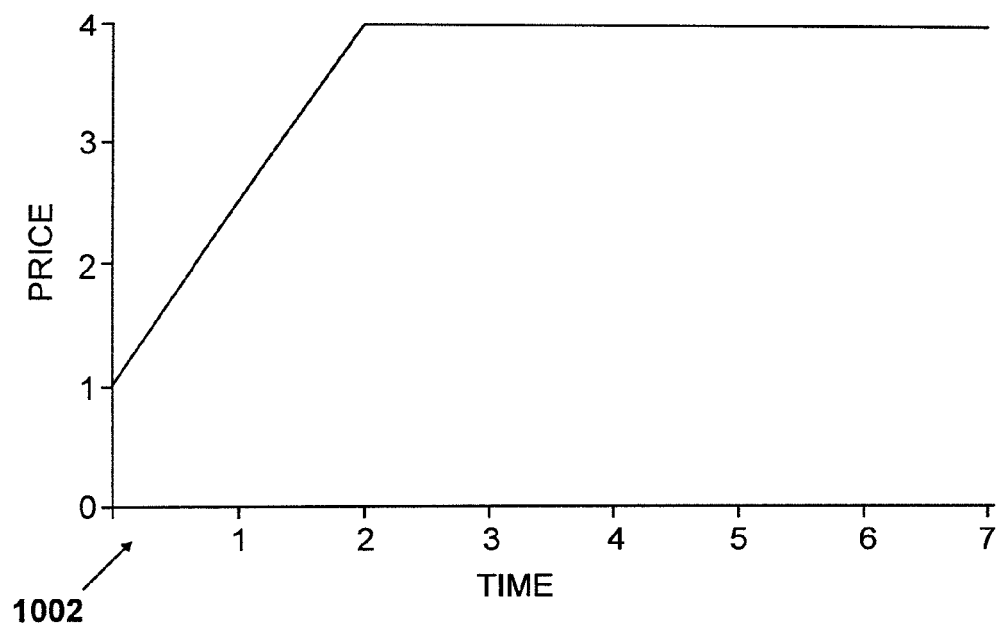

An example of a discount that varies with respect to time is illustrated in FIG. 10. The first functional relationship is shown at 1001, in which an offer price is plotted against time. At the start of the sale, the item is being offered for sale at a price of one unit (the usual selling price being four units). After one unit of time, the offer price ramps linearly over a period of time from one unit to six units, such that after six units of time it has reached the normal full selling price of four units.

An alternative linear function is shown at 1002. Again, at time zero (t=0) the price is set at one unit. However, thereafter, the price ramps up quickly such that after two units of time the item price has reached its full price of four units.

In an alternative embodiment, it is possible for different responses to be selected in response to an alternative variable. Thus, in an embodiment, the additional variable may represent availability. With lots of availability, a response which offers discounts for a substantial period of time, such as that illustrated at 1001 may be put in place. Similarly, if supply is low and items are being bought quickly, the response may be modified so as to follow the function illustrated at 1002.

In an alternative embodiment, it may be possible for a seller to select a particular type of function considered to be most appropriate. To achieve this, a seller may be presented with a menu of different functions such that upon manual selection a function of the type illustrated at 1001 may be selected or alternatively a function of the type illustrated at 1002 may be selected. It should also be appreciated that many other function types may be selected from this menu, some of which may be non-linear.

FIG. 11

Figure 11:
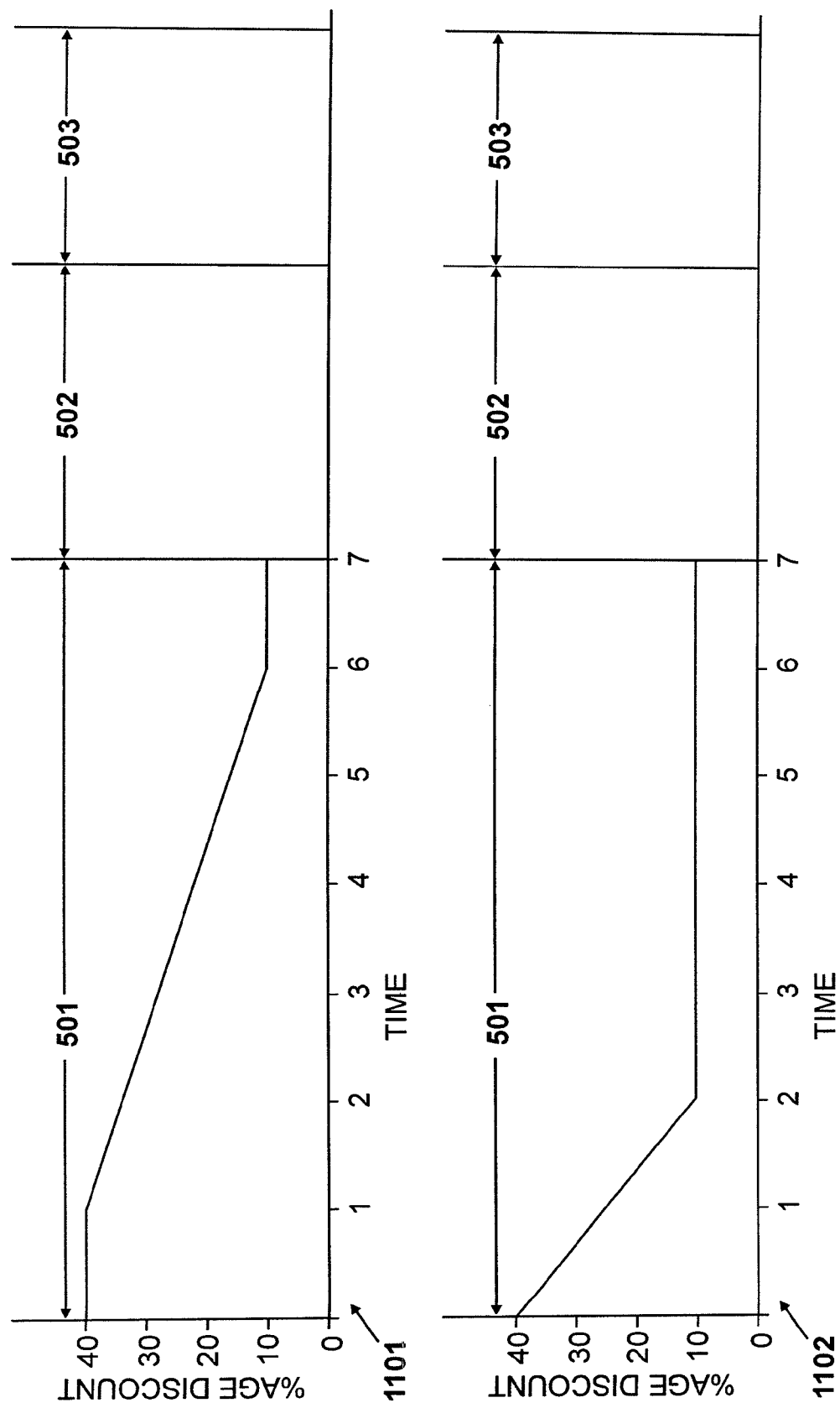
FIG. 11 shows processing procedures performed by a processing unit of the type shown in FIG. 3.
Figure 12:
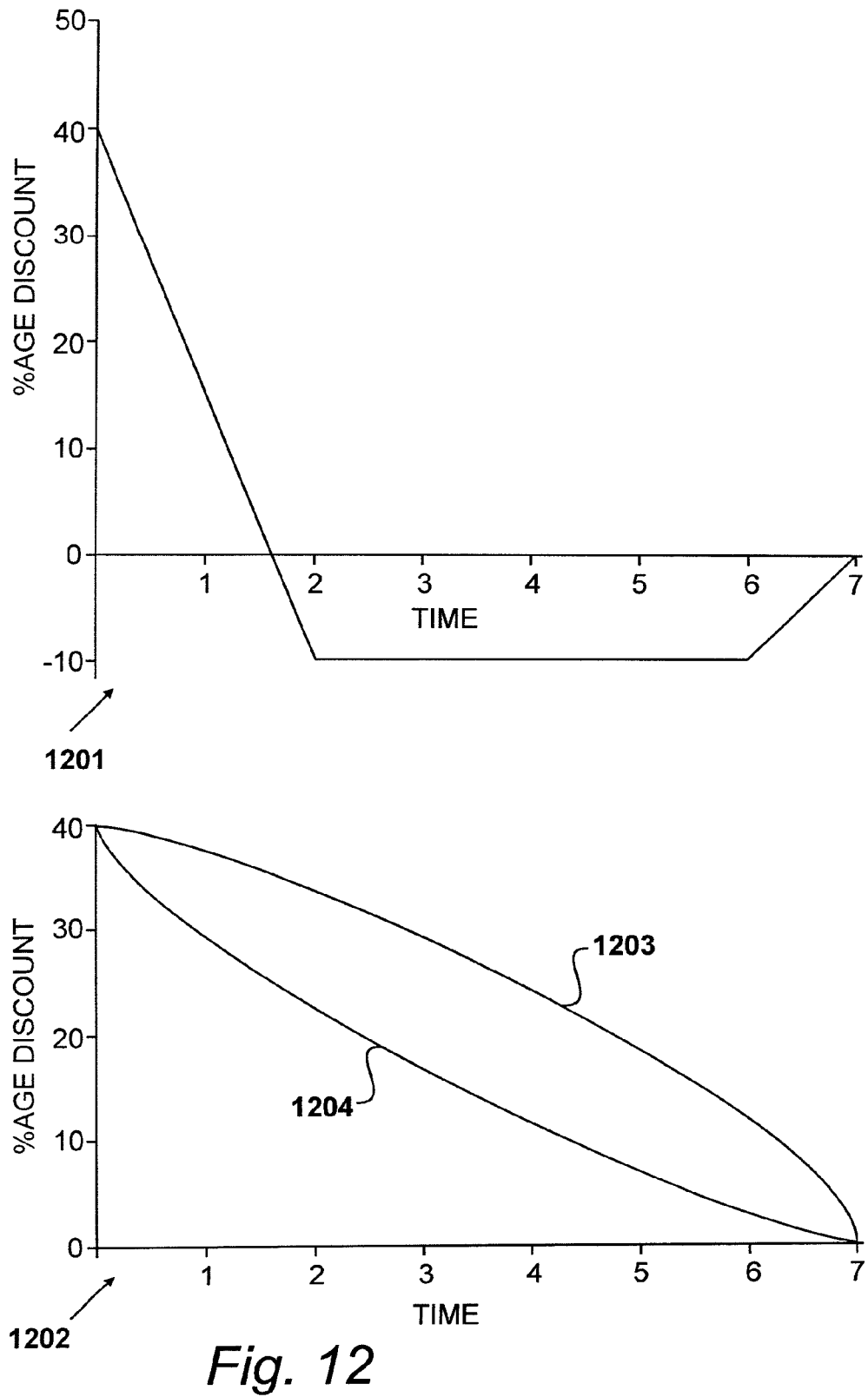
FIG. 12 details procedures concerning media selection identified in FIG. 11.

It is possible for the functional discount approach illustrated in FIG. 10 to be combined with other preferred embodiments described above, as illustrated in FIG. 11.

A discount profile illustrated at 1101 is substantially similar to that illustrated in 1001 and similarly, a discount profile is illustrated at 1102 that is substantially similar to that illustrated at 1002. However, in accordance with a first preferred embodiment, a period during which an item is offered for sale forms part of a first multifunction stage 501, which is then followed with an auction stage 502 and a fulfillment stage 503.

Similarly, in accordance with a second preferred embodiment, the actual offer price is represented by a price modifier, in this example a discount, as an alternative to the actual price. Thus, in this example, first phase 501 is illustrated by a functional relationship 1101 or 1102 in which a percentage discount figure is plotted against time.

In accordance with the relationship shown at 1101, an initial discount of 40% is offered. After one unit of time, the available discount decreases linearly, such that after six units of time the available discount has been reduced to 10%.

Similarly, as illustrated at 1102 an initial discount of 40% may immediately start to be reduced in a linear fashion such that after two units of time it has been reduced to 10%.

In accordance with a preferred embodiment, as shown in both examples, after seven units of time the percentage discount has been reduced to zero and thereafter the auction phase starts during stage 502.

FIG. 12

An alternative discount profile is illustrated at 1201. In this example, an initial discount is offered at 40% but this immediately starts to drop in a linear fashion such that after two units of time a negative discount is being offered. Consequently, at times shortly before two units of time and shortly after six units of time it is necessary to pay a higher price for the item than the normal price. This represents special conditions such that for a particular event or a particular issue of a publication, a higher price may be charged for advertising items. This represents a condition such that during an auction phase 502 it is expected that item bids will become large (from a price perspective) represented as a negative discount, that is to say a percentage value added to the rate card value not subtracted from the rate card value.

An alternative response is illustrated in the relationship shown at 1202. In this relationship the discount varies non-linearly over seven units of time. A particular curve, such as curve 1203 or curve 1204 may be selected using a graphical user interface in which the curve is defined by a spline or similar non-linear function.

FIG. 13

As previously described, in a preferred embodiment a pre-auction stage 501 occurs during which it is possible to buy an item at the displayed price, make an offer to buy the item at an agreed price or to place a bid for a subsequent auction stage.

It is appreciated that in many environments, including the environment of selling advertising space, a purchaser may wish to purchase several examples of an item at a single visit. When booking theatre tickets for example a purchaser may wish to make a block booking. Similarly, during an advertising campaign it is unlikely that a single advertisement would be placed in a single issue. It is more likely that a spread of advertisements would occur, possibly timed to coincide with the product launch or an external influence.

As illustrated in FIG. 13, in a preferred embodiment it is possible to display multiple advertising slots (or other items) on a single screen. The screen includes a matrix 1301 with advertisement types being displayed vertically and with publication dates being displayed horizontally. In this way, publication dates are identified across the top of the matrix and in a preferred embodiment, for a daily publication a full week would be displayed. Alternatively, for a weekly publication a full month could be displayed or some other appropriate range.

In the example of FIG. 13, seven days are covered ranging from the 15$^{th}$ to the 21$^{st}$ of the month. For each of these dates, for the particular publication under consideration, advertising space is available for a front half page, a back half page, a TV page, a sports page, and quarter page advertisements on pages 2, 3, 4 and 5. Thus, in this particular example, eight advertising slots are available on each date of publication.

The matrix shown may be extended to show further days in the future by the use of a scroll bar 1302. In addition, the user may extend the window image vertically to view additional possibilities for advertisement opportunities using vertical scroll bar 1303.

Figure 14:
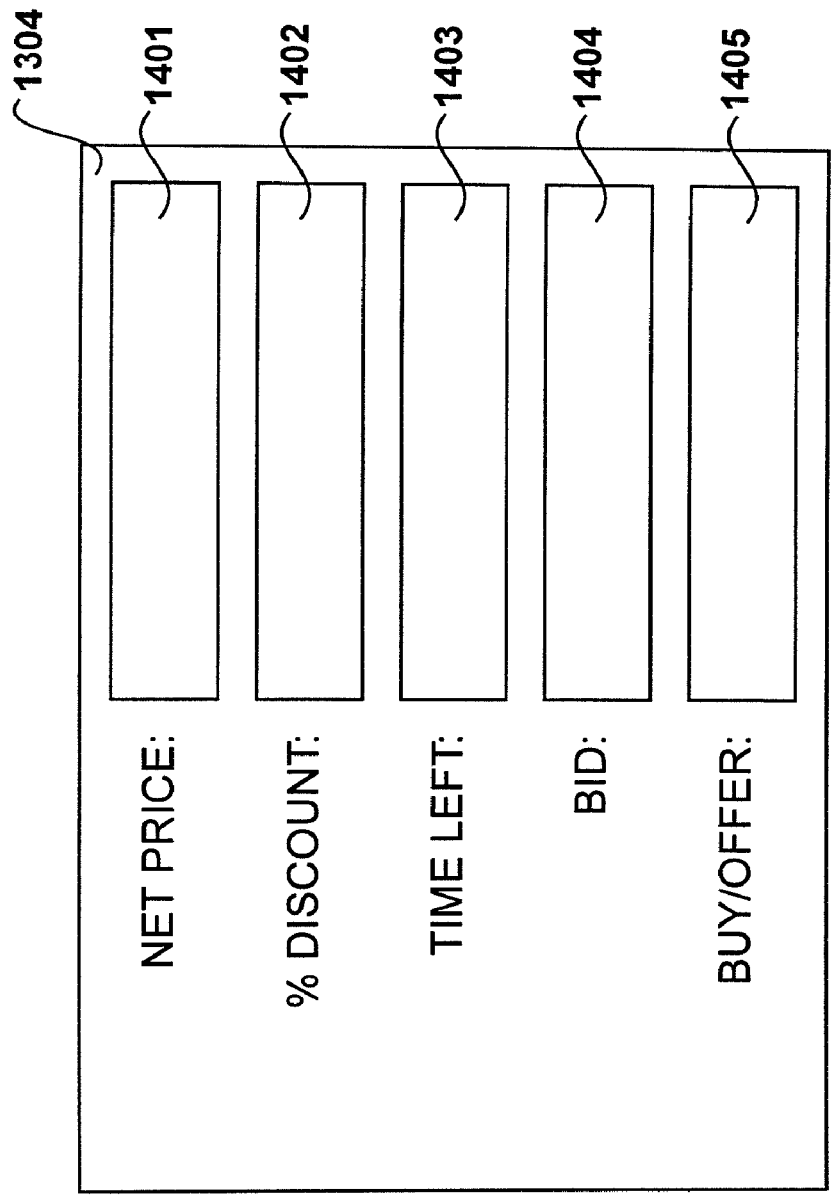
FIG. 14 shows an example of a display shown to a user via a monitor such as that shown in FIG. 4.

Particular cells within the matrix, such as cell 1304 include particular data entries, as detailed in FIG. 14. A user may express an interest in a particular cell by effecting a mouse click over that cell as an interaction with the graphical user interface. Thus, the mouse cursor may be brought into position over cell 1304, whereafter a mouse click is effected so as to highlight cell 1304. Thereafter, having identified cell 1304 it is possible for an interaction to take place.

FIG. 14

Cell 1304 is detailed in FIG. 14. The cell 1304 includes five fields (1401 to 1405) available for receiving data.

At field 1401 the net price of the item is identified. At field 1402 a current percentage discount is identified. In a first embodiment this percentage discount may remain constant throughout the pre-auction stage 501. The percentage discount available may be zero, therefore the item is only being offered at the original net price. Alternatively, in a preferred embodiment, the percentage discount available during the pre-auction stage 501 may change.

At field 1403 the time left for the pre-auction stage 501 is identified. This represents the remaining time during which it is possible to buy the item or to make an offer, pending the auction stage 502 during which it is only possible to place a bid.

Field 1404 allows a bid to be placed which is then acted upon during the auction stage 502.

Field 1405 allows the price to be specified that represents a buy or an offer. In a preferred embodiment, field 1405 is populated with a figure representing the net price displayed at field 1401 less any discount displayed at field 1402. This "buy now" price is preferably represented in a particular color. Thus, a buy now price in field 1405 may be displayed in red.

In a preferred embodiment, it is possible for a buyer, using keyboard 402 for example, to overtype a value within the buy/offer field 1405. Entry of alternative data in field in 1405 effectively represents an offer as an alternative to a confirmation of a buy. Thus, the figure entered would normally be less than the figure currently displayed. Furthermore, in order to emphasise that this represents an offer and not a confirmation of a buy, it is preferable for the figures to be shown in an alternative color. Thus, figures displayed in field 1405 may be displayed in red, representing the buy now figure or alternatively displayed in green, representing an offer.

FIG. 15

A preferred embodiment for grouping offers may stand alone or may precede an auction stage, such as auction stage 502. This preferred embodiment relates to a method of automating the sale of items in which elements available for sale are displayed in such a way that they are subject to offers. Consequently, each of the elements is displayed with a field receptive to an offer price being entered. In addition, in the preferred embodiment, there is provided a grouping function and in response to selecting the grouping function it is possible for individual items to be placed within a group. As such, the group is provided with a single field receptive to an offer price being entered for the group as a whole.

Figure 15:
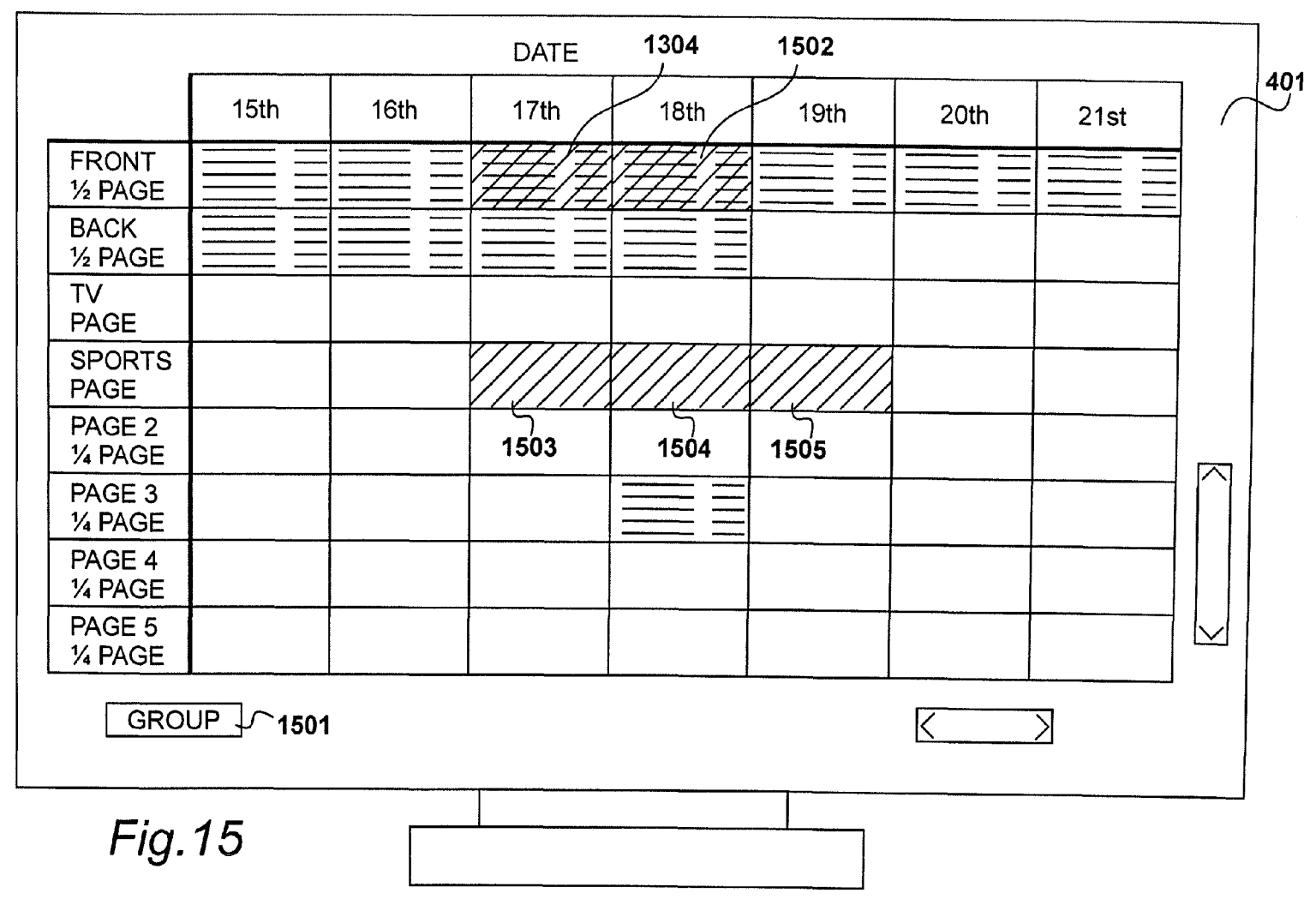

As illustrated in FIG. 15, a button 1501 identified as a "group" is provided. If a user wishes to group items together in accordance with this aspect of the preferred embodiment, the group function 1501 is selected by application of mouse 403. Thereafter individual entries may be highlighted, again by application of mouse 403. Thus, again, a user may select item 1304. However, having previously activated group button 1501, further selections may be made, such as item 1502, item 1503, item 1504 and item 1505. In this example, the user has expressed an interest in taking advertising space within the publication consisting of the front half page on the 17$^{th}$ and the 18$^{th}$, along with the sports page on the 17$^{th}$, 18$^{th}$ and 19$^{th}$. This may, for example, represent a particular campaign being deployed so as to coincide with a particular sporting event.

Data entry is now effected in a way substantially similar to that described with respect to FIG. 14. However, the data entry is now occurring with respect to the group as a whole, as distinct to making these offers with respect to each individual item within the group. To facilitate this, a preferred embodiment allows data to be entered in only one cell of the matrix, such as first selected cell 1304. The grouped cells are shaded out in some way or made blank such that it is not possible for data to be entered. Alternatively, a new window may be displayed allowing data entry for the whole group.

The nature of the data entry is substantially similar to that shown in FIG. 14, consisting of a net price, a percentage discount, a time left, a bid and a buy or offer field. However, when a group selection is made, the net price displayed at field 1401 represents the total price for the group. Thus, the buy figure displayed at field 1405 represents the total net price less the available discount. Consequently, upon entering a revised figure (by keyboard 402) within field 1405, the offer made (preferably displayed in green) represents an offer being made for the whole group which, in this example, represents a total of five items.

FIG. 16

Figure 16:
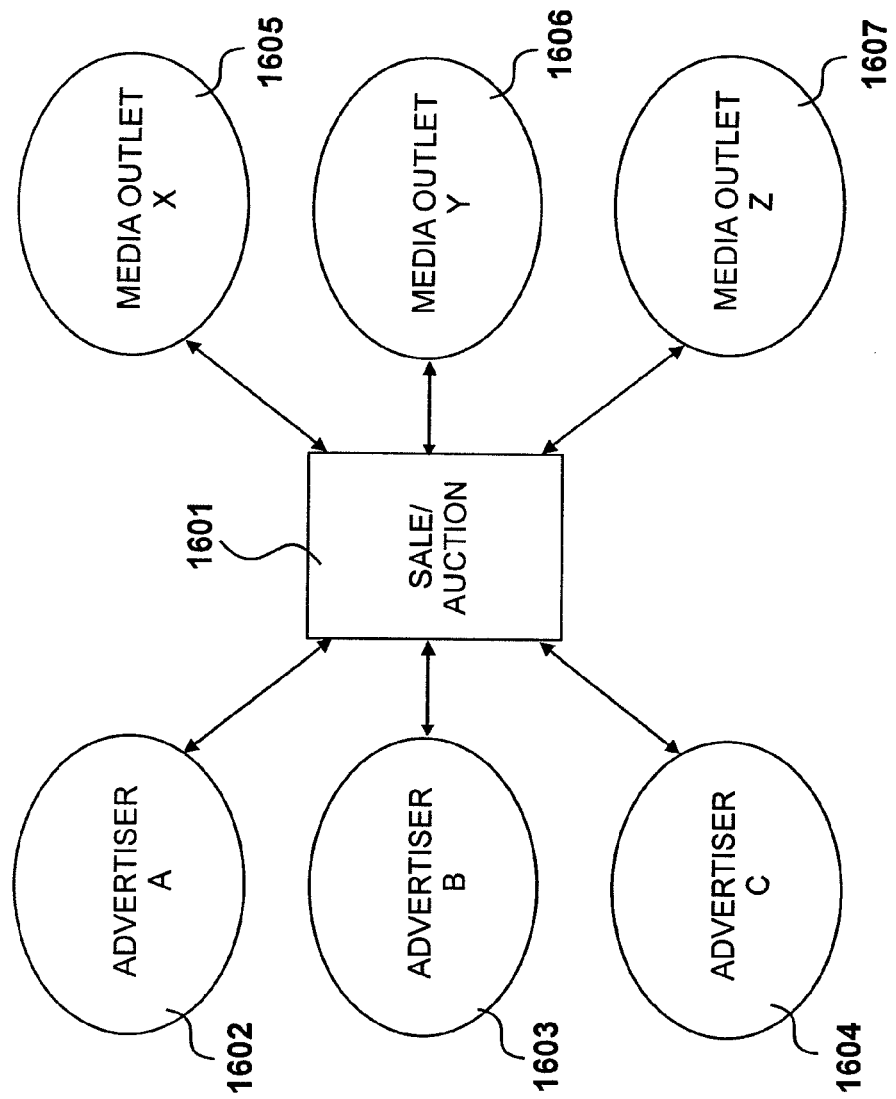
FIG. 16 shows a user display of the type generated by the steps shown in FIG. 15.

A functional environment is illustrated in FIG. 16, showing an alternative representation to the environment of FIG. 1. In this representation, a technical sale/auction platform 1601 communicates with a plurality of advertisers, identified as advertisers 1602, 1603 and 1604; although substantially more advertisers would usually be included.

Similarly, the technical platform 1601 communicates with a plurality of media outlets, illustrated as outlets 1605, 1606 and 1607. These media outlets may include the national newspapers, national periodicals and other media where it is possible for an advertisement to be placed. It should also be appreciated that the environment is not exclusively directed towards published advertisements and the techniques deployed herein may be used in other types of advertising and in many other general auction procedures.

FIG. 17

Figure 17:
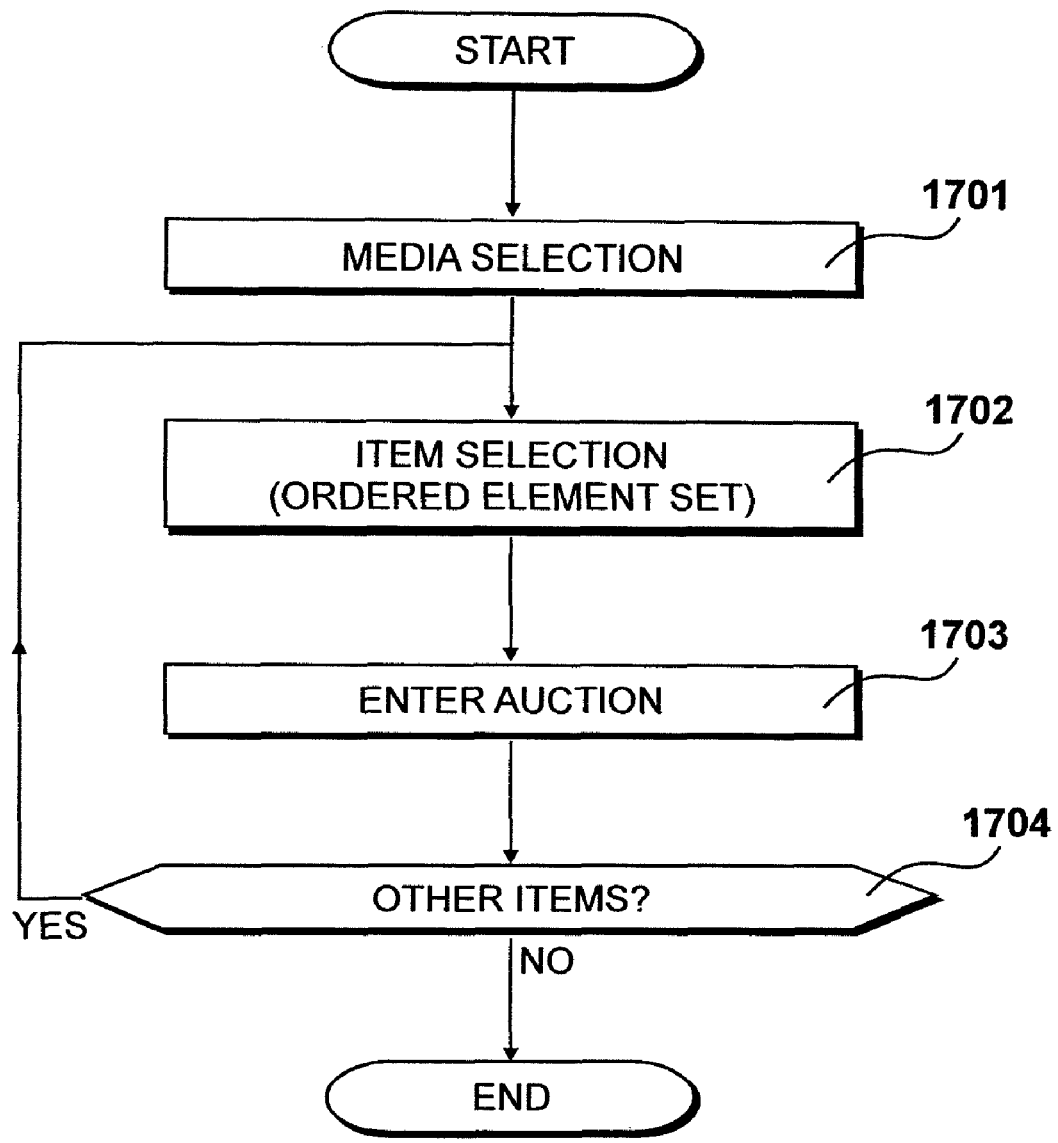
FIG. 17 shows a preferred embodiment in which discount is defined as a function with respect to time.

Procedures performed by a processing unit 302 are illustrated in FIG. 17. In a preferred embodiment, elements to be auctioned represent similar examples of an item that are substantially mutually exchangeable and are susceptible to being ranked in order of perceived value. In a preferred embodiment described herein, the item is an advertisement of a particular size in a particular newspaper on a particular day and the elements represent similar opportunities to advertise within the same newspaper. Thus, each of these elements within the newspaper will include an allocated standard price, referred to in the art as a rate card price.

The processor unit 302 generates output data that facilitates the display of information at a client terminal, such as the terminal shown in FIG. 4. This display relates to information concerning active auctions such that bids may be returned from clients back to the server. In a preferred embodiment, bids are not made with respect to the actual selling price but with respect to a price modifier, such as an applied discount. Thus, bids may be placed in terms of a discount value with respect to the rate card price. For example, given a rate card price of $100, a bid of 50% would effectively equate to a bid of $50. In this environment, a higher bid is represented by a lower discount figure. Furthermore, it is possible for discount to be negative such that a bid is effectively being made that is higher than the rate card price.

The data processing unit 302 is configured to arrange the elements into a list of perceived value and thereafter process the rate card price in combination with the received price modifier to produce an actual price. As the auction progresses, offers are ranked with respect to the received price modifiers such that bidders that bid the more attractive price modifier (i.e. the lowest discount in a preferred embodiment) are allocated the more highly ranked elements. For example, an element that represents an advertisement on the front page of a newspaper would be ranked more highly than an advertisement occurring elsewhere in the newspaper, although the actual nature of the advertisement in terms of its position on the page and its overall dimensions would be identical.

Upon initiating a session, a client communicates with the network server. At step 1701 media selection is made and at step 1702 item selection is made thereby identifying a particular ordered element set of an item type.

At step 1703 the client enters the live auction and places a bid. The client may stay in the auction for a period of time, although it is more likely that further interactions for different auctions would be required. Thus, at step 1704 a question is asked as to whether other items are selected and when answered in the affirmative further selection takes place at step 1702. When complete, the question asked at step 1704 is answered in the negative and the session terminates.

FIG. 18

Figure 18:
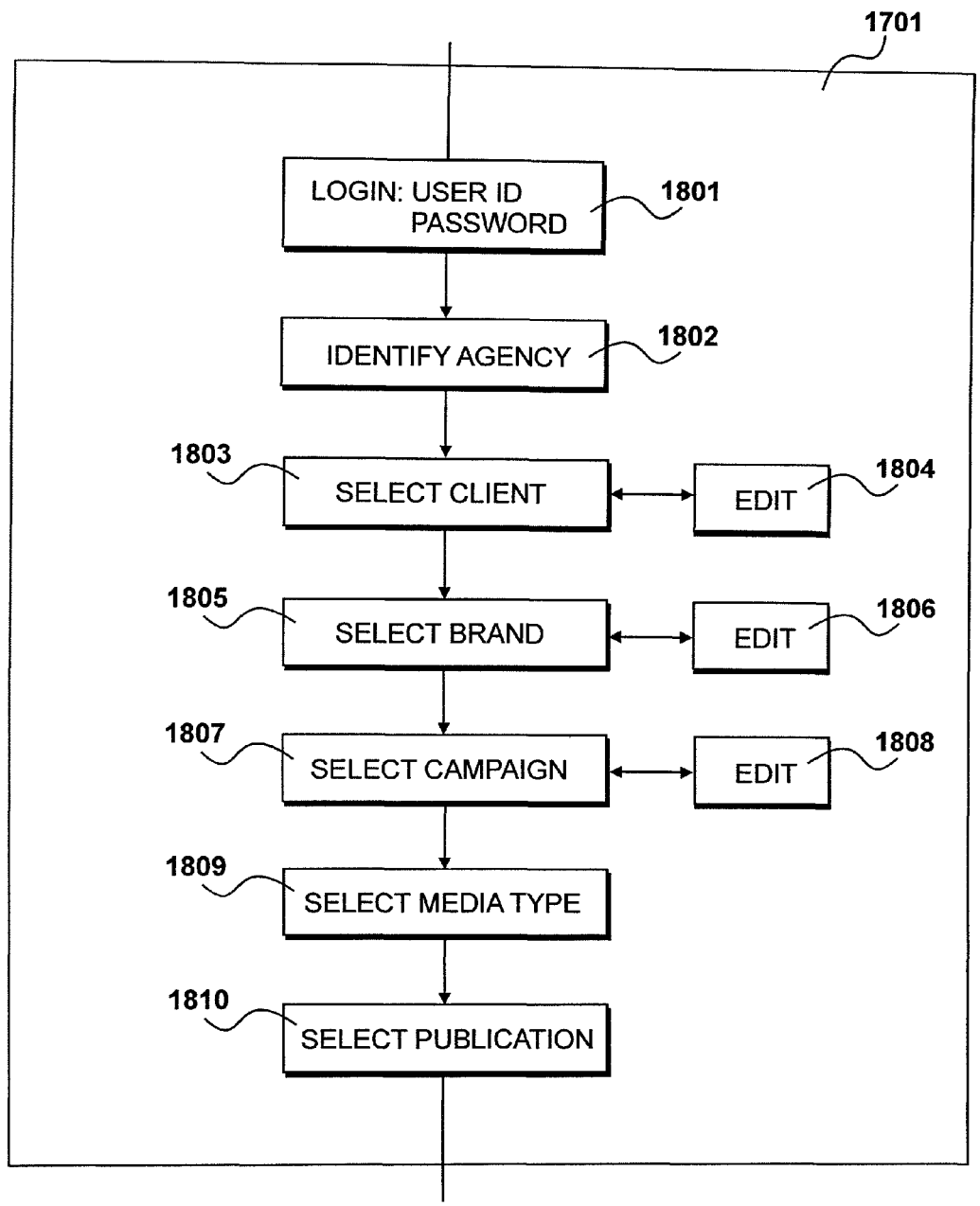
FIG. 18 shows the combination of the discount functional approach with other preferred embodiments.

Procedures 1701 concerning media selection are detailed in FIG. 18. At step 1801 a user performs a log-in operation by identifying a user ID and a password. At step 1802 the user's agency (assuming the user is a member of an agency) is identified. In this particular environment it is envisaged that bids being placed by agencies would represent a high proportion of the total bids being made.

At step 1803 the user identifies their particular client (i.e. the particular advertiser for whom they are working) for the particular campaign under consideration. An edit function 1804 is also provided thereby allowing the user to define new clients which then are preferably selected by means of a drop-down box.

Similarly, at step 1805 a brand selection is made and again it is possible for new brands to be identified (or deleted) via an edit function 1806.

Having selected the brand at step 1805, the campaign is identified at step 1807 and again it is possible for new campaigns to be specified via an edit function 1808.

At step 1809 a media type is selected (such as newspapers, magazines, television or radio etc. At this point, it may be possible for the system to check whether the user under consideration has been given authority to purchase advertising space for the particular media type of interest. Thus, some users may be restricted to, say, newspaper advertising while others may be restricted to radio advertising for example.

Thereafter, at step 1810, the particular publication of interest is selected. Thus, for example, having selected newspapers at step 1809 a particular publication is selected at step 1810.

FIG. 19

Figure 19:
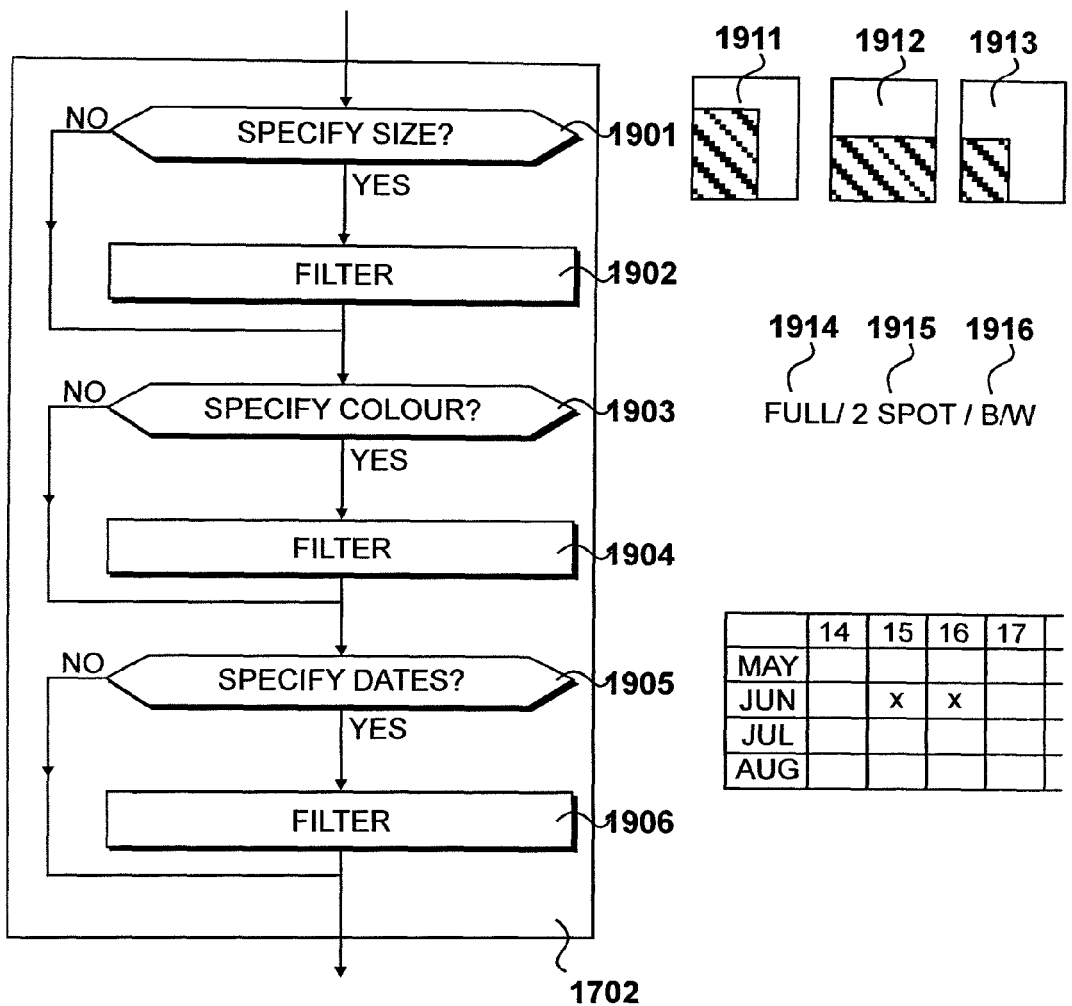
FIG. 19 illustrates alternative discount profiles.

Procedures 1702 for specific item selection are detailed in FIG. 19. Having selected a particular publication at step 1810 many auctions may have been established or defined that relate to the particular publication. It is therefore likely that the user will wish to make a more refined selection which can be achieved in accordance with procedures 1702 via a filtering process. Thus, at step 1901 it is possible for a user to specify an advertisement size. For illustrative purposes, examples of advertisement sizes are shown, in which 1911 represents a three-quarter page advertisement, 1912 represents a half-page advertisement and 1913 represents a quarter-page advertisement. However, it should be emphasised that the advertisement types shown in FIG. 19 are not exclusive. Thus, having specified a size, a filtering operation is performed at step 1902 thereby refining the advertising auctions that may be selected.

At step 1903 a question is asked as to whether color is to be specified. In this example, it is possible to specify full color 1914, a two-spot color 1915 or black and white 1916. Again, having made a selection, a filtering operation is performed at step 1904.

A preferred embodiment of the invention is directed towards the auctioning of elements that represent similar examples of an item. The nature of the similarity will depend upon the nature of the items and also the preferences of the seller. For example, in this advertising space example, items of differing size (such as quarter pages and half pages) may be considered as similar items to be auctioned together or alternatively may be considered as separate items, with individual elements for each. Similarly, black and white items may be mixed with color items, such that individual elements may be more similar or less similar; a situation which may be considered as being defined by the granularity of the similarity.

At step 1905 it is possible to specify dates and in the example shown a selection has been made to the effect that the client is interested in the 15th and 16th of June. Thus, again, having made the selection a filtering operation is performed at step 1906.

FIG. 20

An example of a display 2001 shown on a buyer's monitor, such as monitor 401, is illustrated in FIG. 20. Procedures 1701 and 1702 have been invoked, resulting in a table 2002 of relevant auctions being displayed to the potential buyer. In the table 2002, column 2003 identifies a publication date and, in this example, publication dates for the $15^{th}$ and the $16^{th}$ of June are displayed.

Column 2004 identifies an auction date, that is the date on which the auction phase will be initiated. In this example, auctions will start on Friday $12^{th}$ for publication on Monday $15^{th}$ etc.

Column 2005 defines the size of the advertisement and in this example, a quarter page advertisement is available, a half page is available, a further quarter page is available, a banner and a further quarter page.

Column 2006 identifies the current auction discount, which would need to be matched or improved in order to enter into the auction. Thus, in the example shown, entries are displaying discounts of 15% (the first two), 12%, 5% and 2%.

Column 2007 identifies the likely position of the advertisement in the publication. Preferably, this information should be as accurate as possible given that, in this particular embodiment, position will have a substantial influence upon the perceived value. Thus, examples are shown for the position as being at the front top of the publication, the back bottom, the inside back and so on.

Column 2008 identifies the net cost. Thus, this represents the cost of the advertisement before the auction discount has been applied. However, it should be noted that discounts may have been offered for other reasons (such as for particular buyers or for receiving early commitments). In a preferred embodiment, these other reason discounts are not taken into account when displaying the net cost figure in column 2008.

In column 2009 a check box is displayed as an invitation to join a particular auction. Thus, in response to checking a box in column 1409, a selection has been made to the effect that the client wishes to enter the auction, thereby invoking procedures 1703.

FIG. 21

Figure 21:
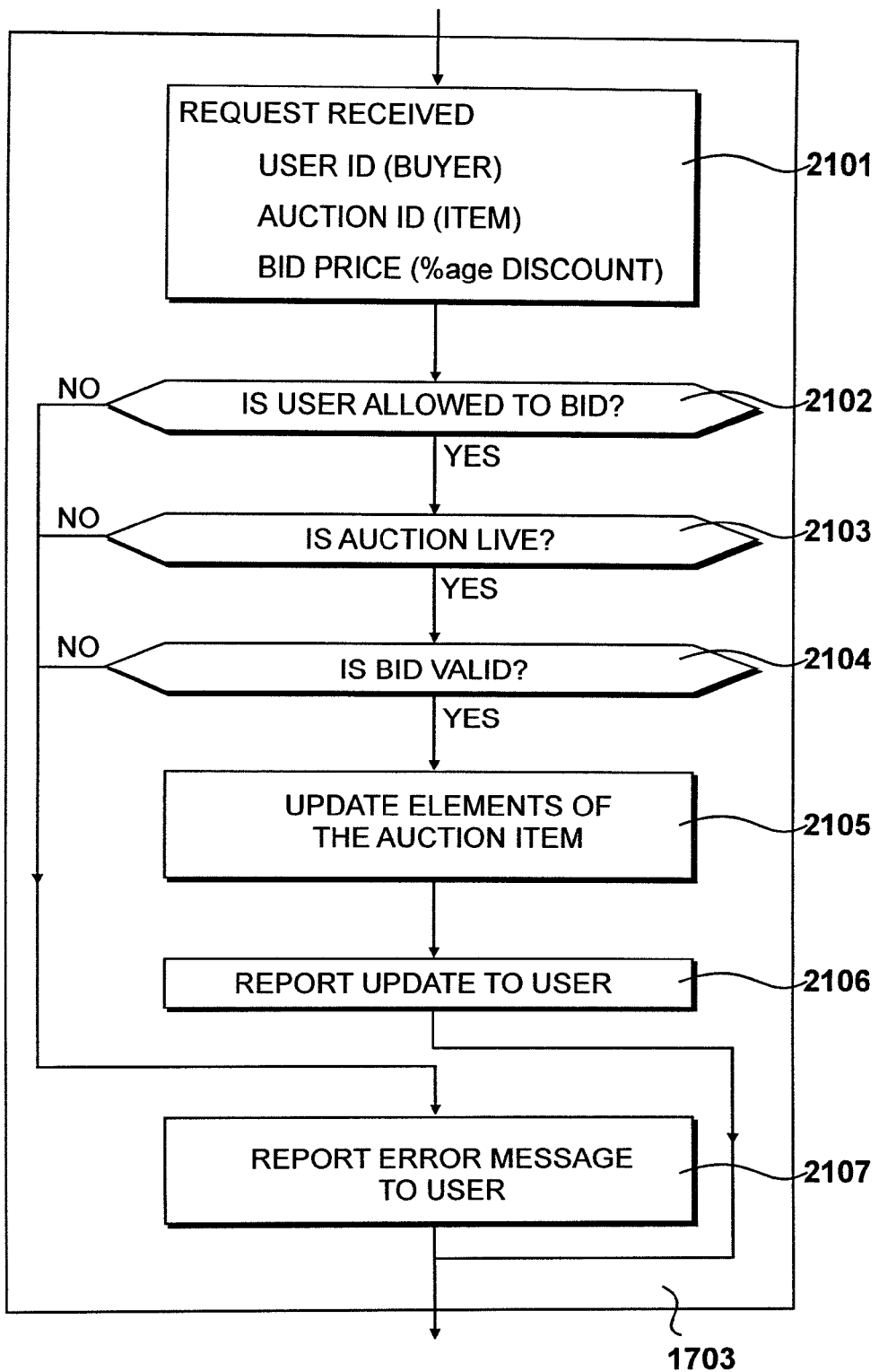
FIG. 21 details a cell of the type shown in FIG. 20.

Procedures 1703 for entering the auction are detailed in FIG. 21. At step 2101 it is noted that a request has been received from a user, resulting in the recording of a user ID (identifying the buyer), an auction ID, as a result of a box in column 2009 being checked (each auction having its own unique ID number) and a bid price. Thus, in response to a box being checked, the user is invited to make a bid which, in this embodiment, takes the form of a percentage discount of the rate card value.

Having received an indication of a user, an identification of the auction and a bid at step 2101, a question is asked at step 2102 as to whether the user is allowed to bid. In this respect, a check is made as to whether the auction is available to that particular buyer and as to whether the bid that has been proposed is consistent with any pre-established ground rules.

At step 2103 a question is asked as to whether the auction is live. Thereafter, if answered in the affirmative, a questions is asked at step 2104 as to whether the bid is valid. If any of the questions asked at steps 2102 to 2104 are answered in the negative, an appropriate error message is returned at step 2107.

In response to a valid bid being made (the questions asked at step 2104 being answered in the affirmative) elements of the auction item are updated at step 2105. This results in the generation of a bidding table and information from the bidding table is communicated to the user for display, as shown at step 2106.

FIG. 22

Figure 22:
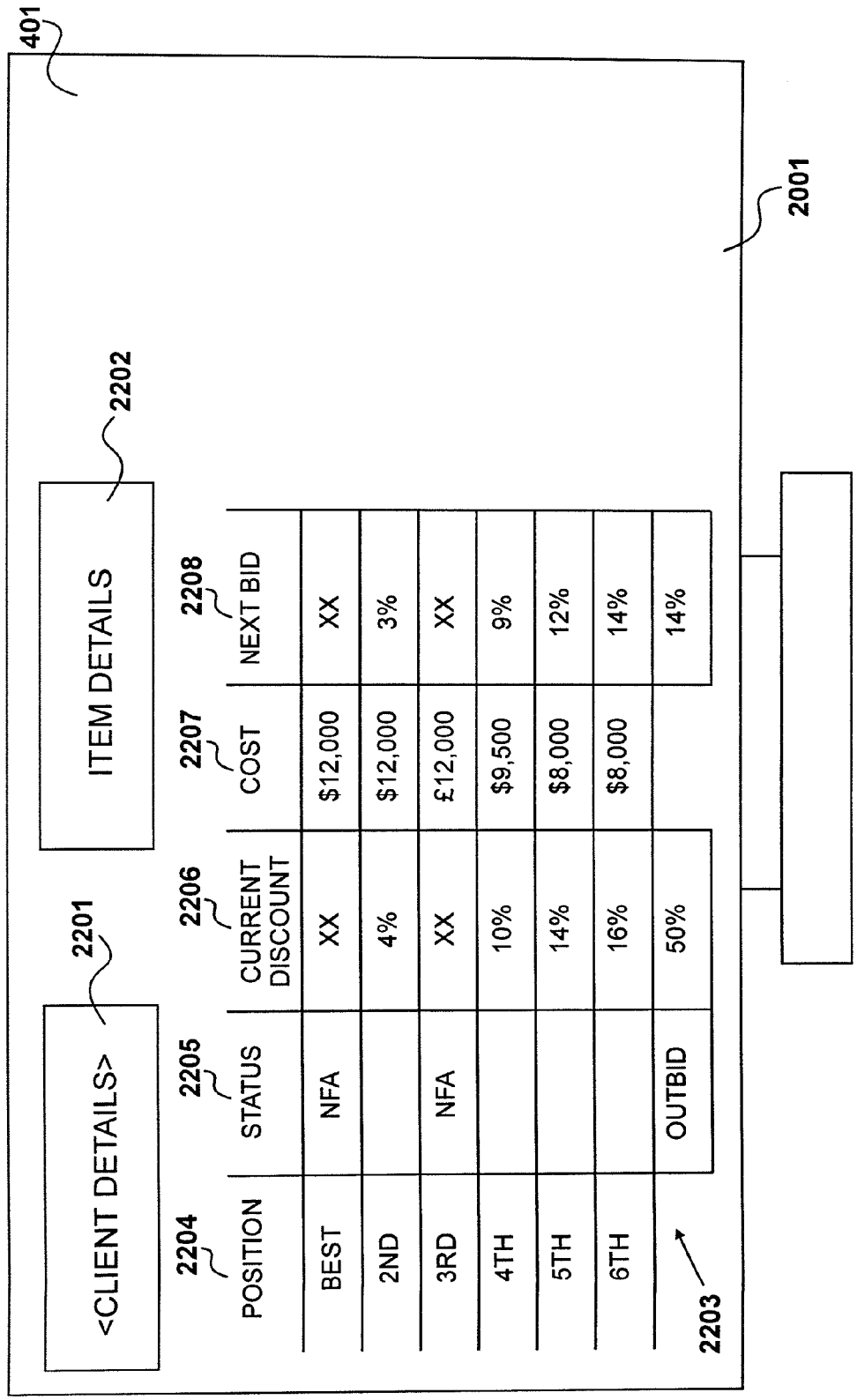
FIG. 22 illustrates the definition of a group.

A user display of the type generated at step 2106 is shown in FIG. 22. In the displayed screen, an area 2201 shows information about the user, primarily the information specified by the user during step 1701, such that the user's client, brand, campaign and media type are displayable.

At region 2202 details relating to the item under consideration are displayed. Primarily, this would include information derived from process 1702, identifying the size of the advertisement, the color of the advertisement and the dates on which the advertisement is to appear in a particular publication.

The table 2203 identifies the specific elements in the form of an ordered element set for the item under consideration. Column 2204 shows the ordering of the elements. Thus, although all of the elements are substantially similar and all fall within the definition of the item details 1602, it is possible for the elements to be ranked in terms of their perceived value. Thus, six elements of the item exist ranked from best to sixth.

Column 2205 identifies the status of the elements. With the entry left blank, a user knows that an element is in the auction and it is possible for a user to bid for that element. If the element has been removed from the auction, usually during the pre-auction stage 501, its existence in the list is still maintained, but its status is identified as NFA (i.e. not available for auction). In an alternative embodiment the element is simply removed from the list.

Column 2206 identifies the current discount figures. In this specific example, the best element and the third best element are not for auction therefore no current discount figure is present. The second best position has been allocated to a bidder bidding a 4% discount. Similarly, the fourth best position is currently at a 10% discount, the fifth is at a 14% discount and the sixth is at a 16% discount. The next best bid was made at 50% but no further elements exist resulting in a status being recorded to the effect that the bid has been outbid.

Column 2207 identifies the cost of the element before the discount has been applied. Thus, the second best entity is identified as having a cost of $12000, while the sixth best entry is identified as having a cost of $8000. However, the actual cost for the second entry will be $12000 less 4%, and the sixth best entry will attract a cost of $8000 less 16%. Thus, the auctioning process effectively emphasises the perceived difference in value, in that bidders bidding the lowest discounts will tend to attract the more highly priced entries. It is therefore possible for an initial assessment of perceived value to be self-correcting as the auction process takes place.

If the initial perceived value has been calculated correctly, the spread of discounts will tend to be small as each element may be considered as having substantially equal value. However, if the perceived values have been calculated incorrectly, the spread of discounts will tend to increase as only the high value entries will be seen as desirable and the other entries will only become attractive if a significant discount can be achieved. Column 2208 illustrates the amount of discount that must be bid in order to displace the current discount level.

The processes described above provide a method of auctioning elements that represent similar examples of an item, that are mutually exchangeable and are susceptible to being ranked in an order of perceived value. The specific example refers to advertisement space in newspapers where the item is a particular advertisement type appearing in a particular publication on a particular day. However, in the particular publication several items of this type exist thereby representing the plurality of elements. Some of these elements will have a higher perceived value, such as advertisements appearing on a front page.

In an alternative embodiment, other examples are possible. Thus, for example, the item may represent a seat at a public event, such as a concert, occurring at a particular time on a particular day. The elements of the item represent the plurality of seats available in the auditorium and clearly some seats will have a higher perceived value than others, usually those having a central location at the front of the first balcony for example.

It has been shown that the elements may be arranged in a list of perceived value and a standard price may be allocated for each of these elements. The standard price is then processed in combination with the price modifier to produce an actual price that may be higher than, lower than or the same as the standard price. In the advertising space example, this standard price is often referred to as a rate card price.

Bidders are invited to bid with a proposed price modifier (not the actual price) and the price modifiers are ranked such that the bidders that bid the more attractive price modifier are allocated the more highly ranked elements. Thus, in a preferred embodiment, the price modifier is a percentage discount and the processing step produces the actual price by subtracting the percentage discount from the standard price. In a preferred embodiment, the bids are made in terms of a percentage discount and bidders submitting lower percentage discounts are placed higher up the ranking.

It is possible for this auction stage to be preceded by a multifunction stage and in the multifunction stage it may be possible to buy an element, make an offer or place an auction bid. During the auction stage it is only possible to place an auction bid in accordance with the procedures identified above.

FIG. 23

In a preferred embodiment, an auction stage 502 is preceded by a pre-auction stage 501. In the pre-auction stage 501, it is possible to purchase items whereafter in the auction stage 502 it is only possible to enter the auction. However, it is possible in an alternative embodiment to initiate the procedure by entering the auction stage without a pre-auction stage.

It is well known for items placed in an auction to be placed on the basis that a reserve price exists and that an actual sale will only take place if a bid reaches or exceeds this reserve. Often, the reserve price is unknown to bidders but in alternative embodiments the reserve price could be made known.

In an upgrade auction, an example of which has been described, many elements exist that may be considered examples of the item for sale. In a first preferred embodiment, all of the items are shown immediately, even when conditions exist to the effect that none of the bids have reached a set reserve price. In the alternative embodiment described with respect to FIGS. 23 to 28, a reserve price is established for all elements of the item. Initially, the availability of a single exemplar is displayed for the elements when bids are received that fall below the reserve. The availability of a plurality of elements is then displayed only upon receiving bids that are above the set reserve price.

Having entered the auction stage 502, it is now no longer possible to make an offer for items. Consequently, a facility for grouping a plurality of items is not made available and a different representation is provided so as to draw a distinction between item types and examples of elements that populate the item types. As previously described, these distinctions will be drawn dependent upon the nature of the item itself. However, in a preferred embodiment, it is envisaged that different publication dates or other date related constraints would represent boundaries between individual items. Thus, an item would exist on a particular day and the individual elements would also all occur on that particular day.

Figure 23:
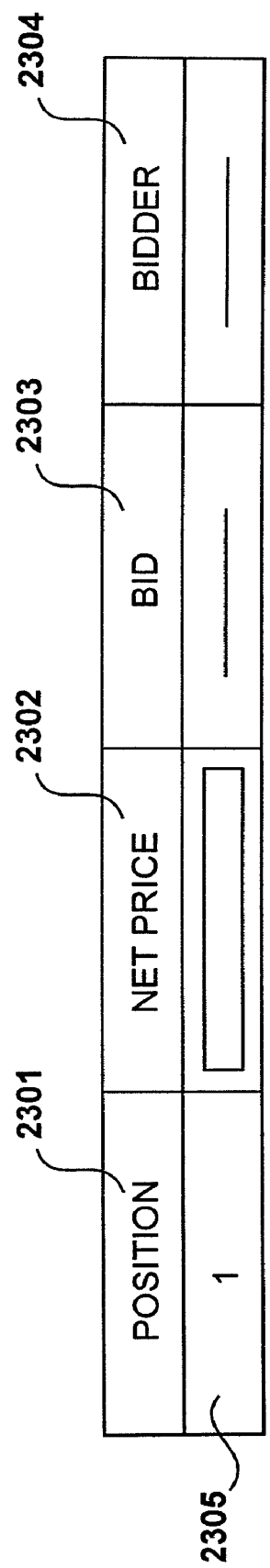
FIG. 23 shows an alternative embodiment in which a display is modified with reference to a reserve price.

An item is illustrated in FIG. 23 that for the purposes of illustration, may be considered as all of the advertising elements available during the $17^{th}$ of a particular month for a particular publication. These would include all of the elements identified in FIG. 22 ranging from the front half page advertisement to the quarter page advertisement on page five. However, as shown in FIG. 23, upon entering the auction stage 502 and upon selecting advertisements available for bidding on the $17^{th}$ in a particular publication, only a single element is displayed. The element is displayed in tabular form showing a position 2301, a net price 2302, a bid 2303 and details of the bidder 2304. A single row 2305 is presented populated with position 1 at column 2301 and an appropriate net price at column 2302. Initially, no bid has been placed, therefore no bidder is identified.

FIG. 24

The graphical user interface provides a selection button to the user allowing the user to make a bid. This results in a screen being displayed to the user (via display unit 401) of the form illustrated in FIG. 24. The screen includes fields 2401 to 2405.

At field 2401 details of the media are displayed, thereby confirming to the user that the bid is being made for the desired publication. Similarly at region 2402 the date of publication is confirmed. A unique auction number is identified at field 2403 and at field 2404 the particular bidder is identified by their identification number.

Figure 25:
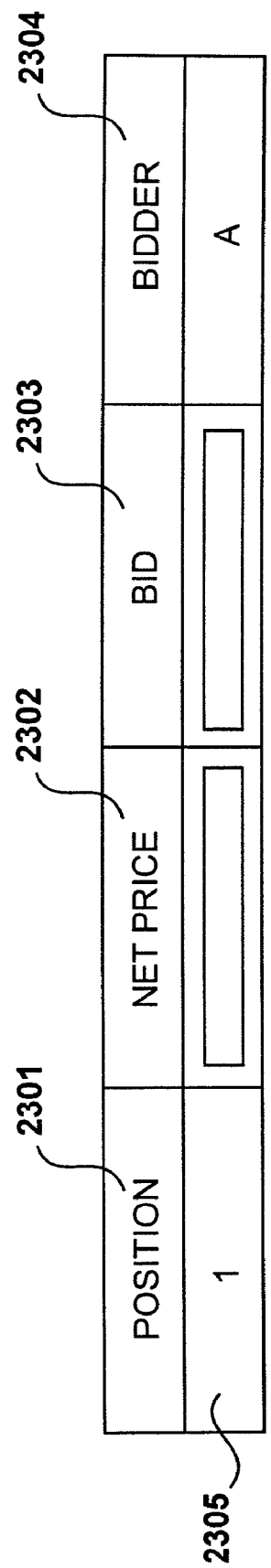
FIG. 25 shows an alternative view of a graphical user interface.

Field 2405 allows the bidder to make a bid by selecting the field, using mouse 403 and then entering an amount using keyboard 402. Operation of the enter key or other appropriate confirmatory action results in the bidding screen being shown again, as illustrated in FIG. 25.

FIG. 25

After the bid has been made, row 2305 again identifies only position 1 at column 2301. Again, the net price is displayed at column 2302 but now the bid made by the bidder is shown in column 2303 followed by an identification of the bidder (shown as "A" in the example) at column 2304.

In this example, the reserve price is not known to the bidder. Having completed the actions identified above (with respect to FIG. 24) the bidder may now be of the opinion that a successful bid has been placed. However, for the purposes of this illustration, it is assumed that the bid placed by the bidder actually falls below the reserve price and therefore in any event the bidder will not be successful at the price bid.

FIG. 26

To continue with this example, it is now assumed that bidder "B" places a bid, that is higher than the bid placed by bidder A. Furthermore, for the purposes of this example, it is assumed that the bid placed by bidder A is above the reserve price and therefore may result in a successful transaction.

Figure 24:
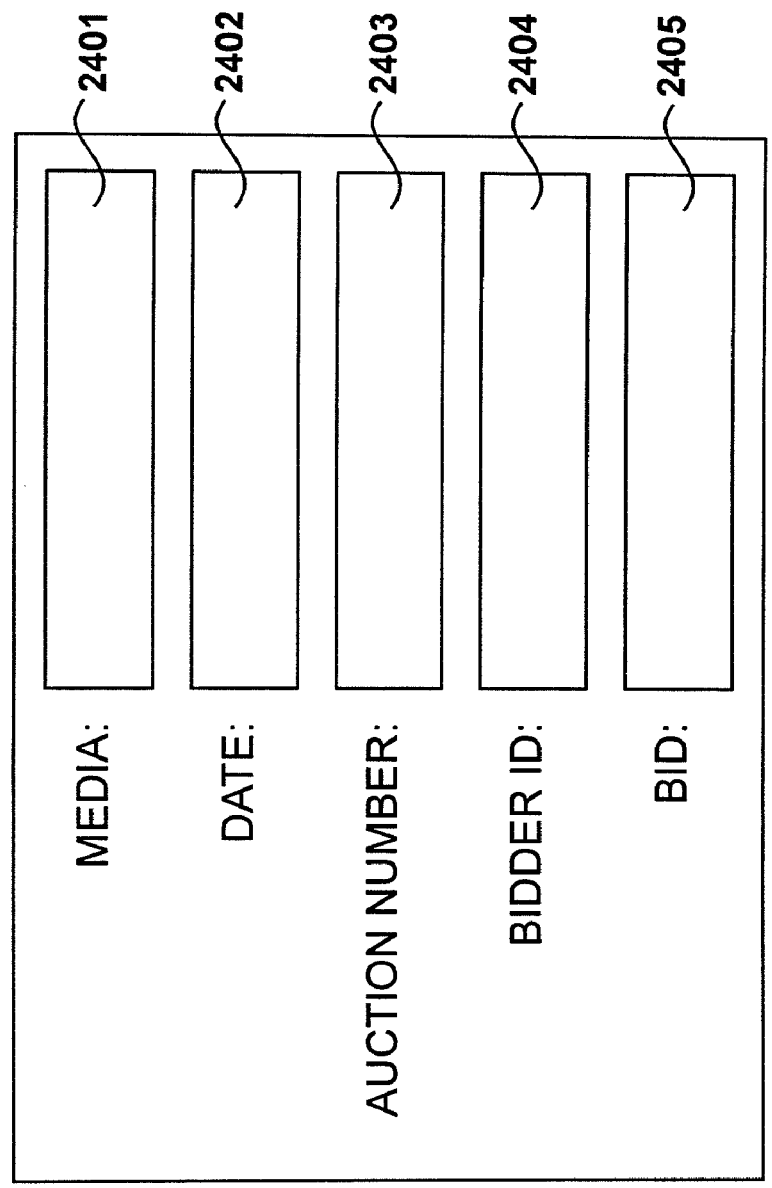
FIG. 24 shows a graphical user interface displayed to a user.
Figure 26:
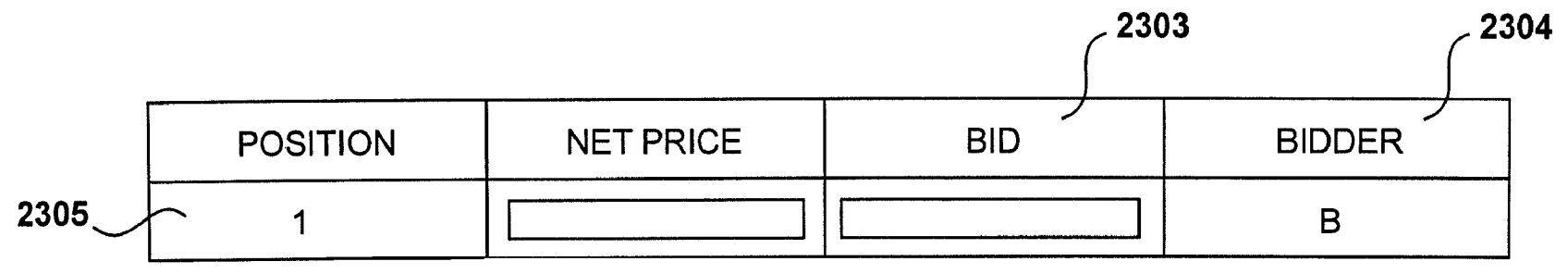

Bidder B is presented with a screen substantially similar to that shown in FIG. 24 and the bid is entered in field 2405. Upon return to the bidding screen, a change has taken place as illustrated in FIG. 26. A single row 2305 remains but in column 2304 a reference to bidder A has been replaced by a reference to bidder B and the bid value at column 2303 will have increased to the bid value made by bidder B.

Again, for the purposes of this example, it is assumed that bidder A returns to the bidding screen whereupon it becomes clear that their bid has failed and that their position has been replaced by bidder B. Again, for the purposes of this illustration, it is assumed that bidder A wishes to advertise in the publication and therefore places a higher bid. Again, bidder A is presented with a screen substantially similar to that shown in FIG. 24, allowing a higher bid to be placed in region 2405. From the perspective of bidder A, an attempt is being made to enter a higher bid than that placed by bidder B, otherwise the bid will be unsuccessful. Consequently, as a result of placing a bid that is higher than the bid placed by bidder B, the bid placed by bidder A will also exceed the reserve price.

FIG. 27

Figure 27:
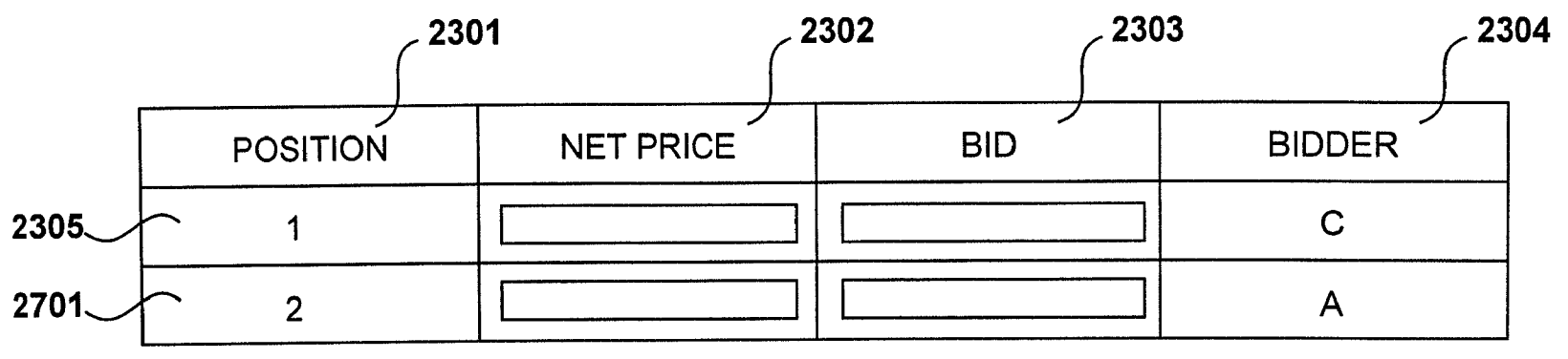

Upon return to the bidding screen, both bidder A and bidder B will be shown a screen substantially similar to that shown in FIG. 27. Row 2305 is present, representing the highest ranking position and is now occupied by bidder A. However, in addition, given that the reserve price has now been met by two bidders, a plurality of elements are being displayed. This results in the bid placed by bidder B also being shown in row 2701. Bidder B has position 2 and their bid is shown in column 2303.

In a first embodiment, all of the elements may have the same net price, representing substantially identical examples of the item. In a first alternative embodiment, different net pieces are given to different elements such that the net price shown in row 2305 would be higher than the net price shown in row 2701. In a second preferred alternative embodiment, net prices vary but bids are made with respect to a modifier and not with respect to an actual price. In a preferred embodiment, bids are made with respect to discount values. Thus, the bidder giving the lowest discount is given the highest position in the ranking. The lowest discount will be allocated to the highest value item, that is the item having the highest net price. The second position (allocated to bidder B in the example shown in FIG. 27) is given to the next highest bid, again represented as the next lowest discount. This would result in a higher discount (compared to bid A) being applied to a lower net price.

FIG. 28

For the purposes of illustration, it is now assumed that a third bidder places a bid, identified as bidder C. Three examples or elements are displayed because three bids have been received that exceed the reserve value. In this example, bidder C has placed a bid that is higher than the bid placed by bidder A. As a result of this, bidder C is placed at the top of the list and the bid made by bidder C is now shown in row 2305. Bidder A has been displaced by one position therefore the bid placed by bidder A is now displayed in row 2701. Bidder B also placed a bid higher than the reserve (although the lowest bid so far) therefore a new row is introduced representing an element at position 3, shown as row 2801. In this particular example, as shown in FIG. 22, a total of eight elements are present within the auction, each representing examples of the item. Thus, further bids may be received up until a total of eight rows representing eight positions have been displayed. Upon receiving a ninth bid, higher than any current bid, one of the existing bidders will be displaced, to be replaced by the new bid.

Consequently, it can be seen that many elements of the item may exist. However, until bids are received that are higher than the reserve price, only a single exemplar is displayed. As bids are received, further examples are shown until the total of available items have been displayed, whereafter rejections will be made.

The invention claimed is:

1. An automated auctioning method with a server computer including a data storage device, a data processing device and a network connection device, said method comprising the steps of:
    providing a multi-function stage, during which said data processing device produces a first graphical user interface to allow a user to:
      a) buy an item outright;
      b) make an offer for an item, whereupon further action is taken to determine whether said offer is to be accepted; and
      c) place an auction bid that is processed in a subsequent auction stage;
    changing automatically, with said processing device, from said multi-function stage to the auction stage after a first predetermined period of time for all items not sold in the multi-function stage such that said processing device produces a second graphical user interface to allow a user during said auction stage to place an auction bid but not to buy an item or make an offer;
    changing automatically, with said processing device, from said auction stage to a fulfillment stage after a second predetermined period of time during which transactions are concluded based on an assessment of data created during said auction stage; and
    wherein said further action is sending a message to a seller in response to the offer being made and wherein the offer is automatically accepted if it falls within a seller defined range.

2. The method as claimed in claim 1, wherein a channel of communication is established between a buyer and a seller in response to an offer being made by said buyer.

3. The method as claimed in claim 1, wherein a buying action or an offering action is not facilitated during said auction phase.

4. The method as claimed in claim 1, wherein said items represent media advertising opportunities.

5. The method as claimed in claim 4, wherein said media advertising opportunities are newspaper advertisements.

6. Internet serving apparatus comprising data storage devices, data processing devices and network connection devices, wherein a processing device is configured to implement a multi-function stage, an auction stage and a fulfillment stage, wherein:
    during said multi-function stage said processing device produces a first graphical user interface to allow a user to:
      a) buy an item outright;
      b) make an offer for an item, whereupon further action is taken to determine whether said offer is to be accepted; and
      c) place an auction bid that is processed in a subsequent auction stage;
    after a first predetermined period of time, said processing device changes automatically from said multi-function stage to said auction stage for all items not sold in the multi-function stage and said processing device produces a second graphical user interface to allow a user to place an auction bid but not to buy an item or make an offer;
    after a second predetermined period of time, said processing device changes automatically from said auction stage to said fulfillment stage during which transactions are concluded based on an assessment of data created during said auction stage; and wherein said further action is taken by said processing device by sending a message to a seller in response to the offer being made and wherein said further action is taken by automatically accepting the offer if it falls within a seller defined range.

7. The apparatus of claim 6, wherein said processing device is configured to establish a channel of communication between a buyer and a seller in response to an offer being made by said buyer.

8. The apparatus of claim 6, wherein said data storage devices store data related to media advertising opportunities.

9. The apparatus of claim 8, wherein said media advertising opportunities are one of:

newspaper advertisements and broadcast advertisements.

10. The apparatus of claim 6, wherein said data storage devices store data related to physical advertising locations.

11. The apparatus of claim 10, wherein said physical advertising locations are locations at exhibitions.

* * * * *